US008940386B2

(12) United States Patent
Ohtani et al.

(10) Patent No.: US 8,940,386 B2
(45) **Date of Patent: *Jan. 27, 2015**

(54) FORMED BODY WITH CURVED SURFACE SHAPE, METHOD OF PRODUCING THE FORMED BODY, FRONT COVER FOR VEHICLE LIGHTING DEVICE, AND METHOD OF PRODUCING THE FRONT COVER

(75) Inventors: Sumio Ohtani, Minami-ashigara (JP); Tadashi Kuriki, Minami-ashigara (JP); Tsukasa Tokunaga, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 970 days.

This patent is subject to a terminal disclaimer.

(21) Appl. No.: 13/054,737

(22) PCT Filed: Jun. 26, 2009

(86) PCT No.: PCT/JP2009/061768
§ 371 (c)(1),
(2), (4) Date: Jan. 18, 2011

(87) PCT Pub. No.: WO2010/007871

PCT Pub. Date: Jan. 21, 2010

(65) Prior Publication Data

US 2011/0134655 A1 Jun. 9, 2011

(30) Foreign Application Priority Data

Jul. 17, 2008 (JP) ................................ 2008-185489
Apr. 14, 2009 (JP) ................................ 2009-098029

(51) Int. Cl.
*B32B 3/00* (2006.01)
*H05B 3/84* (2006.01)
(Continued)

(52) U.S. Cl.
CPC . *H05B 3/84* (2013.01); *F21S 48/10* (2013.01); *F21S 48/34* (2013.01); *F21V 3/00* (2013.01); *F21V 29/008* (2013.01)
USPC ........ 428/195.1; 428/209; 219/202; 219/220; 219/552; 362/92; 362/507

(58) Field of Classification Search
CPC ........... F21S 48/10; F21S 48/34; F21V 3/00; F21V 29/008; H05B 3/84
USPC ........... 219/202, 220, 552; 362/92, 506, 507, 362/509, 546; 428/195.1, 209
See application file for complete search history.

(56) References Cited

U.S. PATENT DOCUMENTS 6,008,581 A * 12/1999 Ochiai et al. .................. 313/582
6,265,466 B1 * 7/2001 Glatkowski et al. .......... 523/137
(Continued)

FOREIGN PATENT DOCUMENTS

JP 62-177885 8/1987
JP 08-180974 7/1996
(Continued)

OTHER PUBLICATIONS

International Search Report/PCT/JP2009/061768, Aug. 18, 2009.
(Continued)

*Primary Examiner* — Gerard Higgins
(74) *Attorney, Agent, or Firm* — Young & Thompson

(57) ABSTRACT

A formed body having a curved surface, a method of producing the formed body, a front cover for a vehicle lighting device, and a method of producing the front cover. A front cover for a vehicle lighting device, mounted to a front opening in a vehicle lighting device having a lamp body and a light source which is provided in the lamp body, wherein a heat generating body is provided in a substantially rectangular region of that surface of the front cover which faces the light source. The heat generating body maintains the relationship of Ra =(2 R0), where R0 is the electric resistance value (initial value) of the heat generating body before the heat generating body is elongated and Ra is the electric resistance value of the heat generating body after the heat generating body is elongated 5%.

10 Claims, 31 Drawing Sheets

(51) Int. Cl.

| | |
|---|---|
| ***F21S 8/10*** | (2006.01) |
| ***F21V 3/00*** | (2006.01) |
| ***F21V 29/00*** | (2006.01) |

(56) References Cited

U.S. PATENT DOCUMENTS

| | | | | |
|---|---|---|---|---|
| 6,762,553 | B1 * | 7/2004 | Yokogawa et al. | 313/509 |
| 8,258,444 | B2 * | 9/2012 | Ohtani et al. | 219/552 |
| 2004/0229028 | A1 | 11/2004 | Sasaki et al. | |

FOREIGN PATENT DOCUMENTS

| | | |
|---|---|---|
| JP | 09-147639 | 6/1997 |
| JP | 10-162961 | 6/1998 |
| JP | 10-289602 | 10/1998 |
| JP | 11-224782 | 8/1999 |
| JP | 2005-302508 | 10/2005 |
| JP | 2007-026989 | 2/2007 |
| JP | 2008-077879 | 4/2008 |
| WO | WO 2006/001461 | 1/2006 |

OTHER PUBLICATIONS

Office Action dated Apr. 30, 2013 issued by the Japanese Patent Office in corresponding Japanese Patent Application No. 2009-098029 with English translation of pertinent portions.

* cited by examiner

20

FORMED BODY WITH CURVED SURFACE SHAPE, METHOD OF PRODUCING THE FORMED BODY, FRONT COVER FOR VEHICLE LIGHTING DEVICE, AND METHOD OF PRODUCING THE FRONT COVER

TECHNICAL FIELD

The present invention relates to a curved-surface (formed) body having a transparent conductor useful for a display device, a lighting device, etc., a method for producing the curved-surface (formed) body, a car light (vehicle lighting device) front cover having a transparent heat generator excellent in visibility and heat generation, and a method for producing the front cover.

BACKGROUND ART

In recent years, in liquid crystal displays, organic and inorganic electroluminescence devices, electronic papers, etc., a film or a glass substrate having a transparent conductive layer has been used as an electrode on the light-emitting side (see, for example, Japanese Laid-Open Patent Publication Nos. 08-180974, 09-147639, 10-162961, and 11-224782).

The transparent conductive layer is generally composed of an indium tin oxide, a zinc oxide, a tin oxide, etc., and has to be thick and uniform to achieve low resistance. Thus, the layer is disadvantageous in low light transmittance, high cost, and that a high temperature treatment is needed in the formation process. Particularly in the case of forming the transparent conductive layer on the film, the resistance can be lowered only to a limited extent.

In view of improving the problem, a method containing adding a conductive component such as a metal wire to the transparent electrode layer (Japanese Laid-Open Patent Publication No. 09-147639), a method containing forming a conductive metal busline on the transparent electrode layer (a transparent positive electrode substrate) (Japanese Laid-Open Patent Publication Nos. 08-180974 and 10-162961), and a method containing forming a network-patterned metal wire structure on the transparent electrode layer (an upper electrode) (Japanese Laid-Open Patent. Publication No. 2005-302508) have been proposed.

Meanwhile, a car light has an illuminance reduction problem. The illuminance of the car light may be reduced due to the following causes:

(1) adhesion and accumulation of snow on the outer circumferential surface of the front cover,
(2) adhesion and freezing of water such as rain water or car wash water on the outer circumferential surface of the front cover, and
(3) progression of (1) and (2) due to use of an HID lamp light source having a high light intensity even under a low power consumption (a small heat generation amount).

Structures described in Japanese Laid-Open Patent Publication Nos. 2007-026989 and 10-289602 have been proposed in view of preventing the illuminance reduction of the car light.

The structure described in Japanese Laid-Open Patent Publication No. 2007-026989 is obtained by attaching a heat generator containing a transparent insulating sheet and a conductive pattern printed thereon to a formed lens using an in-mold method. Specifically, the conductive pattern of the heat generator is composed of a composition containing a noble metal powder and a solvent-soluble thermoplastic resin.

The structure described in Japanese Laid-Open Patent Publication No. 10-289602 is obtained by attaching a heat generator to a lens portion in the car lamp. The lens portion is heated by applying an electric power to the heat generator under a predetermined condition. The document describes that the heat generator contains a transparent conductive film of ITO (Indium Tin Oxide), etc.

SUMMARY OF INVENTION

The methods containing vapor-depositing or sputtering the conductive metal such as ITO on the transparent electrode layer to increase the conductivity (see, for example, Japanese Laid-Open Patent Publication Nos. 08-180974 and 09-147639) are poor in productivity and need improvement in this point. Furthermore, the method using the busline requires an increased number of processes, thereby resulting in high cost.

In Japanese Laid-Open Patent Publication No. 2005-302508, an ITO layer is vapor-deposited to increase the conductivity. However, there are fears of depletion of the ITO material, and thus an alternative material is demanded. In addition, the vapor deposition process is disadvantageous in great loss. The methods containing vapor-depositing or sputtering the conductive metal such as ITO to form the conductive layer (see, for example, Japanese Laid-Open Patent Publication No. 09-147639) are poor in productivity and need improvement in this point.

Meanwhile, in terms of the car light, the conductive pattern in the structure described in Japanese Laid-Open Patent Publication No. 2007-026989 has a large width of 50 to 500 μm. Particularly, a printed conductive wire having a width of 0.3 mm is used in the conductive pattern in Examples of the document. Such a conductive wire is visible to the naked eye, and the structure is disadvantageous in transparency.

In the case of using the thick conductive wire on a headlamp front cover, a long conductive line may be formed by arranging one conductive wire in a zigzag manner to obtain a desired resistance value (e.g. about 40 ohm). However, a potential difference may be disadvantageously generated between adjacent conductive line portions to cause migration.

The structure described in Japanese Laid-Open Patent Publication No. 10-289602 utilizes the transparent conductive film of ITO, etc. as the heat generator. However, the film cannot be formed on a curved surface of the front cover by a method other than vacuum sputtering methods. Thus, the structure is disadvantageous in efficiency, cost, etc.

In addition, since the transparent conductive film is composed of a ceramic such as ITO, the film is often cracked when bent in an in-mold method. Therefore, for example, a car light front cover having a curved-surface body and a transparent heater and a display or lighting device having a curved-surface body and a display electrode cannot be inexpensively produced using the structure. Thus, the structure cannot be practically used.

In view of the above problems, an object of the present invention is to provide a highly conductive curved-surface body and a method for producing the same capable of forming a substantially transparent conductor having a curved surface shape without wire breaking or the like.

Another object of the present invention is to provide a car light front cover and a method for producing the same capable of forming a substantially transparent surface heat generation film on a curved surface, improving the heat generation uniformity, solving the migration problem, and forming a transparent heater on a curved-surface body inexpensively.

[1] A curved-surface body according to a first aspect of the present invention, comprising a transparent substrate having a three-dimensional curved surface and a transparent conductor, wherein when the transparent conductor has an electrical resistance value (initial value) R0 before being stretched and has an electrical resistance value Ra after being stretched by 5%, the transparent conductor maintains the relationship:

$$Ra \leq (2 \times R0).$$

[2] A curved-surface body according to the first aspect, wherein when the transparent conductor has an electrical resistance value Rb after being stretched by 15%, the transparent conductor satisfies the relationship:

$$Rb \leq (2 \times R0).$$

[3] A curved-surface body according to the first aspect, wherein the transparent conductor contains randomly dispersed metal nanomaterials having a diameter of 2 μm or less, which are crossed and connected to each other.

[4] A curved-surface body according to the first aspect, wherein the transparent conductor contains randomly dispersed carbon nanotubes, which are crossed and connected to each other.

[5] A curved-surface body according to the first aspect, wherein the transparent conductor contains a large number of connected thin metal wires formed by exposing and developing a silver salt emulsion layer containing a silver halide, and the thin metal wires have a width of 1 to 40 μm and are arranged at a distance of 0.1 to 50 mm.

[6] A curved-surface body according to the first aspect, wherein the silver salt emulsion layer has an applied silver amount of 1 to 20 $g/m^2$.

[7] A curved-surface body according to the first aspect, wherein the silver salt emulsion layer has a silver/binder volume ratio of 2/1 or more.

[8] A curved-surface body according to the first aspect, wherein the silver salt emulsion layer has a silver/binder volume ratio of less than 2/1.

[9] A curved-surface body according to the first aspect, wherein the transparent conductor has a surface resistance of 10 to 500 ohm/sq.

[10] A curved-surface body according to the first aspect, wherein the transparent conductor has an electrical resistance of 12 to 120 ohm.

[11] A curved-surface body according to the first aspect, wherein the transparent conductor has a minimum curvature radius of 300 mm or less.

[12] A curved-surface body according to the first aspect, wherein the transparent conductor contains a plurality of thin metal wires each extending in the horizontal or vertical direction, and the distance between the thin metal wires extending in the horizontal direction is two or more times as large as the distance between the thin metal wires extending in the vertical direction.

[13] A curved-surface body according to the first aspect, wherein the transparent conductor contains a plurality of thin metal wires each extending only in the vertical direction.

[14] A method according to a second aspect of the present invention for producing a curved-surface body containing a transparent substrate having a three-dimensional curved surface and a transparent conductor, comprising a transparent conductor preparation process of preparing the transparent conductor and a process of placing the transparent conductor in a mold and then injecting a molten resin into the mold, wherein the transparent conductor preparation process contains a step of forming a stretchable conductive layer on an insulating transparent film and a step of forming the transparent film having the conductive layer into a three-dimensional curved surface corresponding to the surface shape of the substrate.

[15] A car light front cover according to a third aspect of the present invention, which is attached to a front opening of a car light having a lamp body and a light source disposed therein, wherein the front cover comprises a heat generator in an approximately rectangular part of the surface facing the light source, and when the heat generator has an electrical resistance value (initial value) R0 before being stretched and has an electrical resistance value Ra after being stretched by 5%, the heat generator maintains the relationship:

$$Ra \leq (2 \times R0).$$

[16] A car light front cover according to the third aspect, wherein when the heat generator has an electrical resistance value Rb after being stretched by 15%, the heat generator satisfies the relationship:

$$Rb \leq (2 \times R0).$$

[17] A car light front cover according to the third aspect, wherein the heat generator contains randomly dispersed metal nanomaterials having a diameter of 2 μm or less, which are crossed and connected to each other.

[18] A car light front cover according to the third aspect, wherein the heat generator contains randomly dispersed carbon nanotubes, which are crossed and connected to each other.

[19] A car light front cover according to the third aspect, wherein the heat generator contains a large number of connected thin metal wires formed by exposing and developing a silver salt emulsion layer containing a silver halide, and the thin metal wires have a width of 1 to 40 μm and are arranged at a distance of 0.1 to 50 mm.

[20] A car light front cover according to the third aspect, wherein the silver salt emulsion layer has an applied silver amount of 1 to 20 $g/m^2$.

[21] A car light front cover according to the third aspect, wherein the silver salt emulsion layer has a silver/binder volume ratio of 2/1 or more.

[22] A car light front cover according to the third aspect, wherein the silver salt emulsion layer has a silver/binder volume ratio of less than 2/1.

[23] A car light front cover according to the third aspect, wherein the heat generator has a surface resistance of 10 to 500 ohm/sq.

[24] A car light front cover according to the third aspect, wherein the heat generator has an electrical resistance of 12 to 120 ohm.

[25] A car light front cover according to the third aspect, wherein the heat generator has a minimum curvature radius of 300 mm or less.

[26] A car light front cover according to the third aspect, wherein the heat generator has a first electrode and a second electrode at the ends, and when two opposite points in the first and second electrodes are at a distance, Lmin is a minimum value of the distance, and Lmax is a maximum value of the distance, the first and second electrodes satisfy the relationship:

$$(Lmax-Lmin)/((Lmax+Lmin)/2) \leq 0.375.$$

[27] A car light front cover according to the third aspect, wherein the heat generator contains a plurality of thin metal wires each extending in the horizontal or vertical direction, and the distance between the thin metal wires extending in the horizontal direction is two or more times as large as the distance between the thin metal wires extending in the vertical direction.

[28] A car light front cover according to the third aspect, wherein the heat generator contains a plurality of thin metal wires each extending in the vertical direction.

[29] A method according to a fourth aspect of the present invention for producing a car light front cover, which is attached to a front opening of a car light having a lamp body and a light source disposed therein, wherein the front cover contains a heat generator in a part of the surface facing the light source, the method comprises a heat generator preparation process of preparing the heat generator and a process of placing the heat generator in a mold and then injecting a molten resin into the mold, and the heat generator preparation process contains a step of forming a stretchable conductive layer on an insulating transparent film, a step of forming the transparent film having the conductive layer into a three-dimensional curved surface corresponding to the surface shape of the front cover, an electrode formation step of forming a first electrode and a second electrode on the opposite ends of the transparent film, and a cutting step of cutting a part of the transparent film having the three-dimensional curved surface.

Advantageous Effects of Invention

As described above, in the curved-surface body and the curved-surface body production method of the present invention, the substantially transparent conductor can be formed in the curved surface shape without wire breaking or the like, the conductivity of the curved-surface body can be improved, and a display or lighting device having a three-dimensional curved display surface can be obtained at low cost.

Furthermore, in the car light front cover of the present invention, the substantially transparent surface heat generation film can be formed on the curved surface, the heat generation uniformity can be improved, the migration problem can be solved, and the transparent heater can be inexpensively formed on the curved-surface body. The heat generator can be used in a windshield cover for a helmet, a car rear window, a tropical fish tank, etc. as well as in the car light front cover.

DESCRIPTION OF EMBODIMENTS

An embodiment of the curved-surface body, the curved-surface body production method, the car light front cover, and the car light front cover production method of the present invention will be described below with reference to FIGS. 1 to 31.

First, a car light front cover according to this embodiment (hereinafter referred to as the front cover 10) will be described below with reference to FIGS. 1 to 18.

Figure 1:
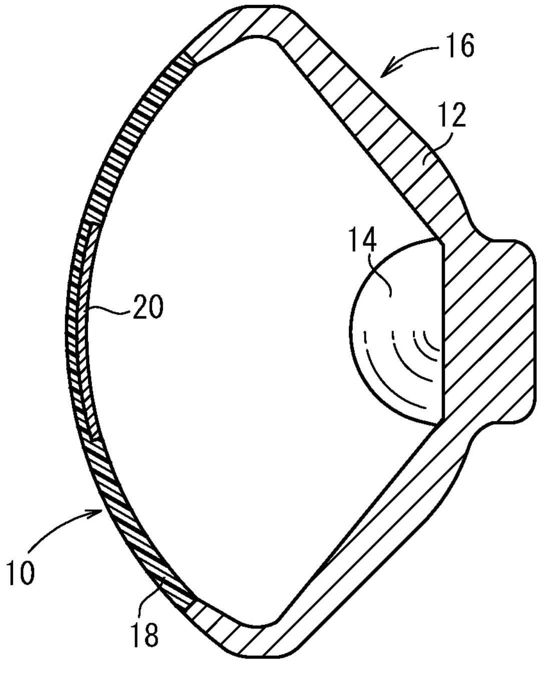
FIG. 1 is a cross-sectional view partially showing a usage of a front cover according to an embodiment of the present invention.

As partially shown in FIG. 1, the front cover 10 is attached to a front opening of a car light 16 having a lamp body 12 and a light source 14 disposed therein. The front cover 10 has a cover body 18 composed of a polycarbonate resin or the like and thereon a heat generator 20 having a curved surface shape (hereinafter referred to also as the transparent heat generator 20). The heat generator 20 is disposed in a part of the surface of the cover body 18 facing the light source 14.

Figure 2:
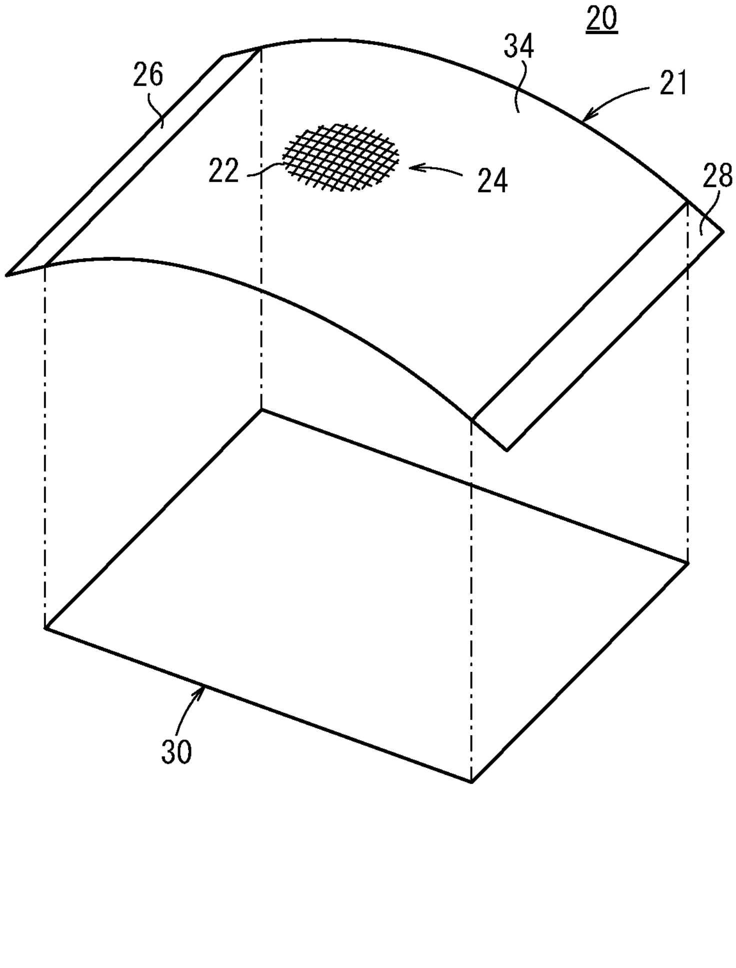
FIG. 2 is a perspective view showing a heat generator according to the embodiment.

As shown in FIG. 2, the heat generator 20 has a conductive layer 21, and further has a first electrode 26 and a second electrode 28 formed on the ends of the conductive layer 21.

The conductive layer 21 has a mesh pattern 24 (partially shown) containing conductive thin metal wires 22 with a large number of lattice intersections. The first electrode 26 and the second electrode 28 are formed on the opposite ends of the mesh pattern 24.

Figure 3A:
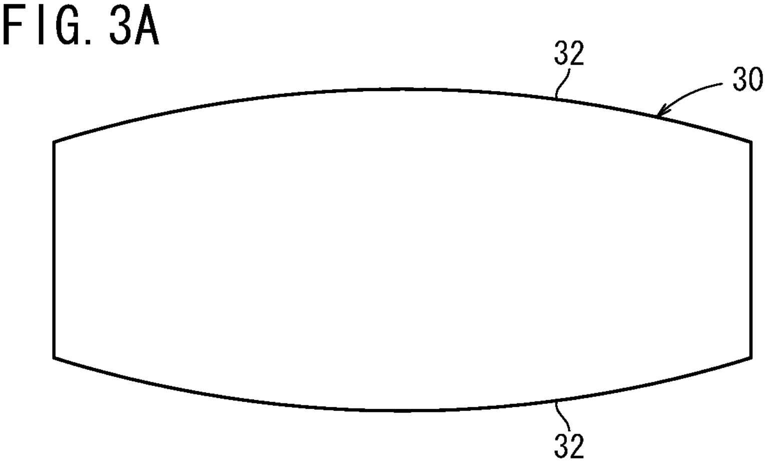
FIGS. 3A to 3C are each an explanatory view showing an example of an overall projected shape of a mesh pattern.
Figure 3B:
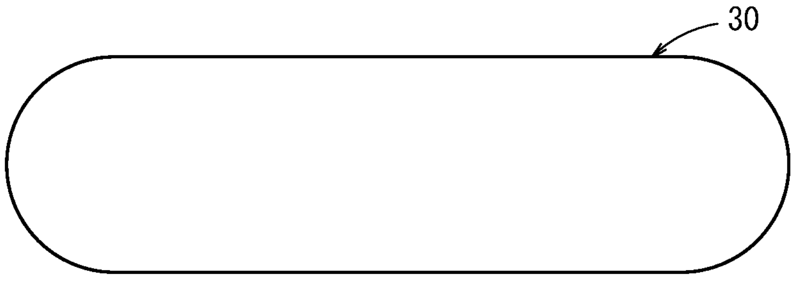
Figure 3C:
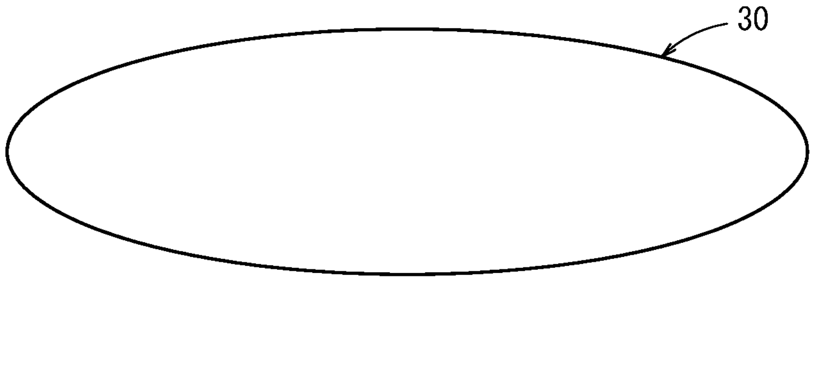

In this embodiment, the overall shape of the conductive layer 21 may be different from the shape of the front cover 10. For example, as shown in FIG. 2, the projected shape 30 (the shape projected on the opening surface of the front cover 10) of the overall shape of the conductive layer 21 may be preferably a rectangular shape having long sides between the first electrode 26 and the second electrode 28. Alternatively, as shown in FIG. 3A, the projected shape 30 may be preferably a rectangular shape having integral curved portions 32 protruding outward from the long sides. It is to be understood that as shown in FIGS. 3B and 3C, the projected shape 30 may be a track or ellipsoid shape. As shown in FIG. 2, a region in the overall shape of the conductive layer 21 contains the mesh pattern 24 and acts as a heat generation region 34 of the heat generator 20.

In this embodiment, when the heat generator 20 has an electrical resistance value (initial value) R0 before being stretched and has an electrical resistance value Ra after being stretched by 5%, the heat generator 20 maintains the relationship:

$$Ra \leq (2 \times R0).$$

Furthermore, when two opposite points in the first electrode 26 and the second electrode 28 are at a distance, Lmin is a minimum value of the distance, and Lmax is a maximum value of the distance, the first electrode 26 and the second electrode 28 satisfy the relationship:

$$(\mathrm{Lmax}-\mathrm{Lmin})/((\mathrm{Lmax}+\mathrm{Lmin})/2) \leq 0.375.$$

Figure 4:
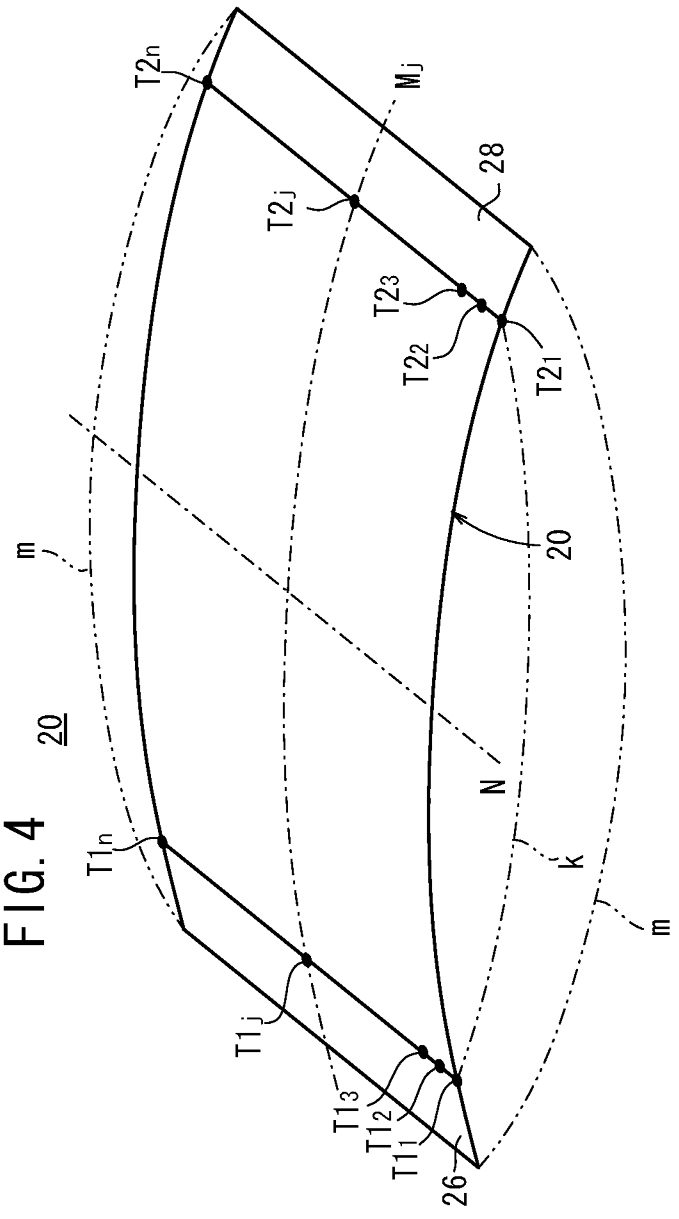
FIG. 4 is an explanatory view showing a distance between two opposite points in first and second electrodes.

The two opposite points in the first electrode 26 and the second electrode 28 are two points that are line-symmetric with respect to an imaginary centerline between the first electrode 26 and the second electrode 28 (a line N perpendicular to a line Mj between the longitudinal center point T1*j* in the first electrode 26 and the longitudinal center point T2*j* in the second electrode 28). For example, as shown in FIG. 4, the two opposite points include the longitudinal center point T1*j* in the first electrode 26 and the longitudinal center point T2*j* in the second electrode 28, and include the longitudinal end point T1*n* in the first electrode 26 and the longitudinal end point T2*n* in the second electrode 28. Furthermore, as shown in FIG. 4, the two opposite points include points $T1_1$ and $T2_1$, points $T1_2$ and $T2_2$, points $T1_3$ and $T2_3$, etc. The minimum value Lmin is the shortest distance between such two opposite points, and the maximum value Lmax is the longest distance between such two opposite points. For example, when the projected shape 30 of the conductive layer 21 is not the rectangular shape but a circular shape corresponding to the shape of the front cover 10 (shown by a two-dot chain line m), the maximum value Lmax is the distance between the points $T1_1$ and $T2_1$ shown by a two-dot chain line k along the circular shape, and the minimum value Lmin is the shortest distance between the center points T1*j* and T2*j*.

The finding of the above relation between the minimum value Lmin and the maximum value Lmax and the realization of uniform heat generation in the heat generator formed in a particular position of the three-dimensional curved surface will be described below.

In conventional surface heat generators for rear windows and headlamp covers, a heat generation wire is distributed over the entire surface to be heated. In general, one wire is used in a small heater of the headlamp cover, and at most ten wires are used in a large heater of the rear window. A current flows from one end to the other end of the wire. Therefore, when all the wires are composed of the same material and have the same width and thickness, the heat generation amount depends on the density of the wires. Thus, in the conventional heat generators, uniform heat generation can be achieved by arranging the wires at a constant density everywhere, regardless of the shape of the region to be heated.

However, the conventional heat generators using the distributed heat generation wire are disadvantageous in that the wire is highly visible to the naked eye, resulting in illuminance reduction of the light source. Thus, in this embodiment, the mesh pattern 24 is formed to prepare the heat generator 20 with a high transparency. The transparent heat generator 20 having the mesh pattern 24 contains innumerable current pathways, and a current is concentrated in a pathway with a low resistance. Therefore, an idea is required to uniformly heat the heat generation region.

A method for achieving uniform heat generation in the transparent heat generator 20 (particularly formed on the three-dimensional curved surface) has been found as follows.

Thus, the heat generation region 34 is formed such that the projected shape 30 is an approximately rectangular shape, strip-shaped electrodes (the first electrode 26 and the second electrode 28) are disposed on the opposite sides, and a voltage is applied between the first electrode 26 and the second electrode 28 to flow a current. Though the projected shape 30 cannot be a precise rectangular shape on the three-dimensional curved surface, it is preferred that the projected shape 30 is made closer to the rectangular shape.

When the heat generation wire is arranged in a zigzag manner in the conventional heat generators, a potential difference is generated between the adjacent conductive line portions to cause migration disadvantageously. In contrast, in this embodiment, the mesh pattern 24 with a large number of lattice intersections is formed by the conductive thin metal wires 22, so that the adjacent wires are intrinsically in the short circuit condition, and the migration is never a problem.

The electrical resistance of the transparent heat generator 20 is increased in proportion to the distance between the first electrode 26 and the second electrode 28 facing each other. Under a constant voltage, the heat generation amount varies in inverse proportion to the electrical resistance. In other words, the heat generation amount is reduced as the electrical resistance is increased. Thus, it is ideal to arrange the first electrode 26 and the second electrode 28 parallel to each other. In the case of heating the particular region on the three-dimensional curved surface, it is preferred that the distance Ln between the two opposite points in the first electrode 26 and the second electrode 28 is within a narrow distance range in any position to uniformly heat the region.

It is considered that the problem of snow or frost is caused mainly at an ambient temperature of −10° C. to +3° C. At −10°

C. or lower, the ambient air is almost free from moisture, and the snow is reduced as well as the frost. At 3° C. or higher, the snow or frost is preferably melted. When the heat generator 20 has a heat generation distribution (variation) of 0, the surface temperature of the front cover 10 can be increased from −10° C. to 3° C. by heating the surface by 13° C. on average. However, when the heat generator 20 has a heat generation distribution (variation) of plus or minus 5° C., it is necessary to heat the surface by 18° C. on average because the temperature rise is distributed between 13° C. and 23° C. The minimum surface temperature of the front cover 10 cannot be increased to 3° C. or higher only by heating the surface by 13° C. on average. Thus, the heat generator 20 having a smaller heat generation distribution (variation) is more advantageous in energy saving.

The temperature increased by the transparent heat generator 20 (the temperature rise range) is preferably such that the minimum is 13° C., the maximum is 19° C., and the average is 16° C. In this case, the energy can be preferably reduced by 2° C. as compared with the above described example, resulting in energy saving. In this case, the temperature distribution ratio is (19° C.−13° C.)/16° C.=0.375. Since the heat generation amount approximately corresponds to the distribution of the distance between the two opposite points in the first electrode 26 and the second electrode 28, the equality of (Lmax−Lmin)/((Lmax+Lmin)/2)=0.375 is satisfied wherein Lmax and Lmin represent the maximum and minimum values of the distance respectively.

When the average temperature increased by the transparent heat generator 20 is controlled at 14.5° C., the maximum temperature Tmax is 14.5−13+14.5=16, and the temperature distribution ratio is (16−13)/14.5=0.207. Therefore, the first electrode 26 and the second electrode 28 may be arranged such that the equality of (Lmax−Lmin)/((Lmax+Lmin)/2)=0.207 is satisfied. In this case, the energy can be preferably reduced by 1.5° C. as compared with the above example using the average temperature of 16° C., thereby being further advantageous in energy saving.

The heat generator 20 preferably has a surface resistance of 10 to 500 ohm/sq. In addition, the heat generator 20 preferably has an electrical resistance of 12 to 120 ohm. In this case, the average temperature increased by the heat generator 20 can be controlled at 16° C., 14.5° C., etc. to remove the snow or the like attached to the front cover 10.

In this embodiment, the thin metal wires 22 in the mesh pattern 24 preferably have a width of 1 to 40 μm. In this case, the mesh pattern 24 can be made less visible to increase the transparency, and thus the illuminance reduction of the light source 14 can be prevented.

The thin metal wires 22 in the mesh pattern 24 preferably have a pitch of 0.1 to 50 mm when the thin metal wires 22 have a width of 1 to 40 μm, the heat generator 20 has a surface resistance of 10 to 500 ohm/sq, and the heat generator 20 has an electrical resistance of 12 to 120 ohm.

The horizontal components of the thin metal wires 22 may scatter a light of a headlight upward, and an oncoming driver may be dazzled by the scattered light. Therefore, it is preferable to minimize the number of the thin metal wires 22 extending in the horizontal direction. It is preferred that the mesh pattern 24 contains the thin metal wires 22 extending in the horizontal direction and the thin metal wires 22 extending in the vertical direction perpendicular thereto. The pitch between the horizontal thin metal wires 22 is preferably two or more times, more preferably four or more times the pitch between the vertical thin metal wires 22. It is also preferred that the mesh pattern 24 contains only the vertical thin metal wires 22 without the horizontal thin metal wires 22. For example, the heat generator may contain only the vertical thin metal wires 22 having a width of 20 μm and a pitch of 600 μm. In this case, the light is not diffused upward, so that the oncoming driver is not dazzled and can maintain an excellent visibility while driving.

A method for producing the front cover 10 will be described below with reference to FIGS. 5 to 18.

Figure 5:
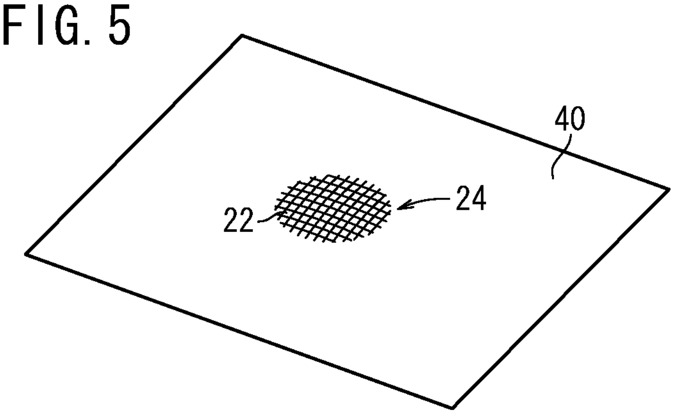
FIG. 5 is a perspective view showing the mesh pattern formed on a transparent film.

First, as shown in FIG. 5, the mesh pattern 24 containing the conductive thin metal wires 22 with a large number of lattice intersections is formed on an insulating transparent film 40.

Figure 6A:
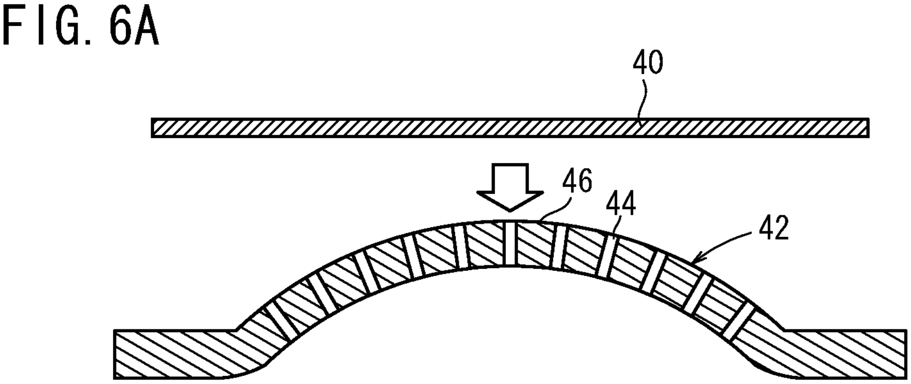
FIG. 6A is a cross-sectional view partially showing a forming mold for vacuum shape forming of the transparent film.

Then, as shown in FIG. 6A, the transparent film 40 having the mesh pattern 24 is formed under vacuum into a curved surface shape corresponding to the surface shape of the front cover 10. The vacuum forming is carried out using a forming mold 42 having approximately the same dimension as an injection mold 50 for injection forming of the front cover 10 (see FIG. 14). As shown in FIG. 6A, when the front cover 10 has a three-dimensional curved surface, the forming mold 42 has a similar curved surface (an inverted curved surface in this case) and a large number of vacuum vents 44. For example, when the front cover 10 has a concave curved surface, the forming mold 42 has such a dimension that a convex curved surface 46 thereof is fitted into the concave curved surface of the front cover 10.

Figure 6B:
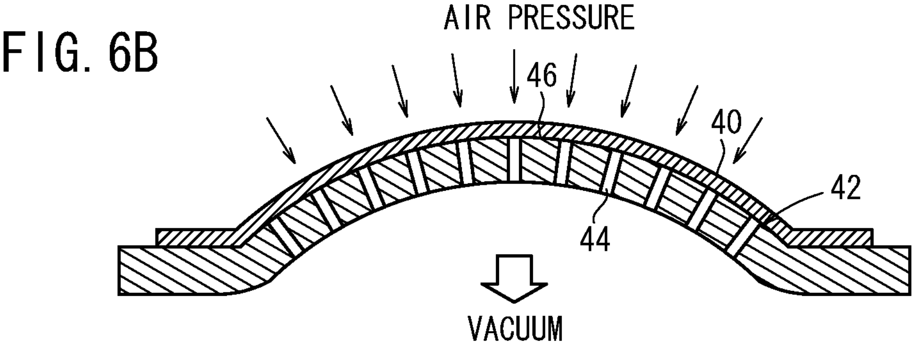
FIG. 6B is a cross-sectional view showing the transparent film pressed to the mold.
Figure 7:
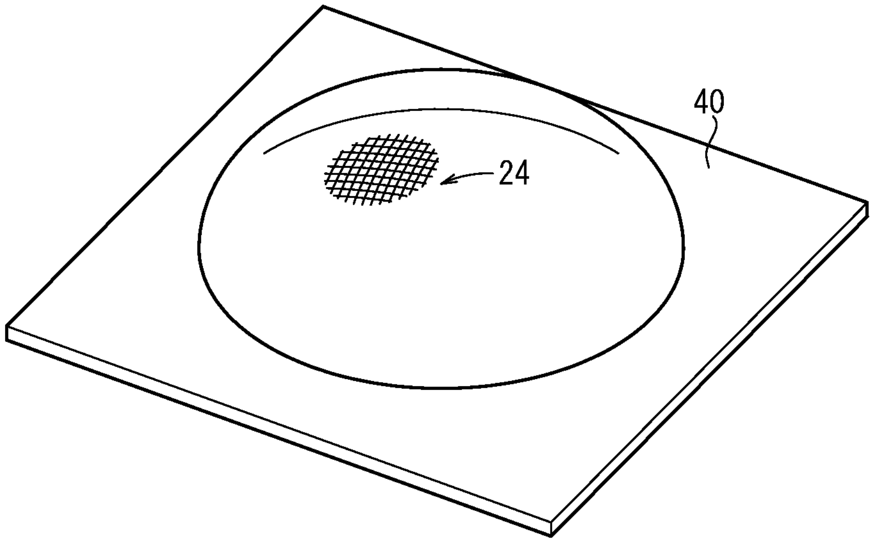
FIG. 7 is a perspective view showing the transparent film having a curved surface shape formed using the forming mold under vacuum.

The vacuum forming of the transparent film 40 may be carried out using the forming mold 42 as follows. For example, as shown in FIG. 6A, the transparent film 40 having the mesh pattern 24 is preheated at 140° C. to 210° C. Then, as shown in FIG. 6B, the transparent film 40 is pressed to the convex curved surface 46 of the forming mold 42, and an air pressure of 0.1 to 2 MPa is applied to the transparent film 40 by vacuuming air through the vacuum vents 44 in the forming mold 42. As shown in FIG. 7, the transparent film 40 having the curved surface shape corresponding to the front cover 10 is obtained by the vacuum forming.

Figure 8:
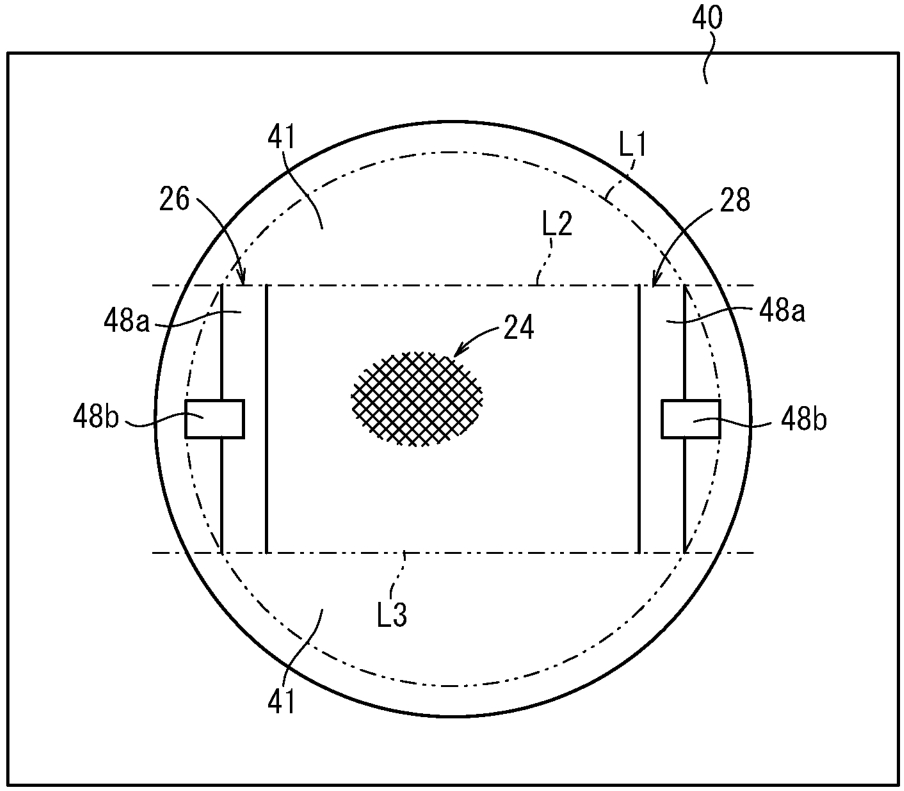
FIG. 8 is a view showing the first and second electrodes formed on the transparent film having the curved surface shape in production of a heat generator according to a first specific example.

As shown in FIG. 8, the first electrode 26 and the second electrode 28 are formed on predetermined positions in the transparent film 40 having the curved surface shape. For example, conductive first copper tapes 48*a* (for forming strip electrodes) are attached to the transparent film 40, and second copper tapes 48*b* (for forming lead-out electrodes) are attached in the direction perpendicular to the first copper tapes 48*a*, to form the first electrode 26 and the second electrode 28. The second copper tapes 48*b* are partially overlapped with the first copper tapes 48*a*.

Figure 9:
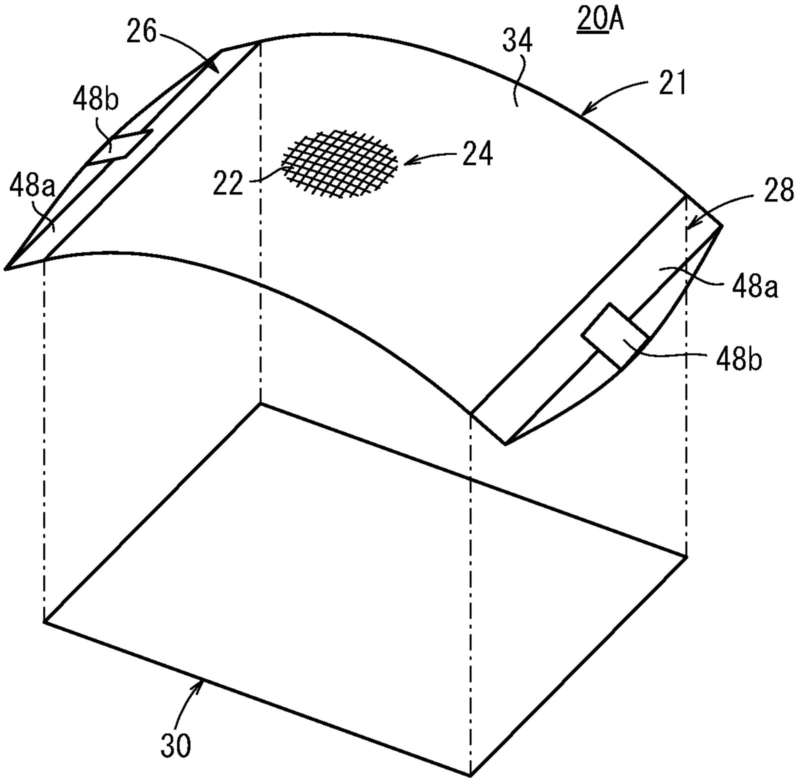
FIG. 9 is a perspective view showing the heat generator of the first specific example prepared by partially cutting the transparent film having the curved surface shape.

As shown in FIG. 9, a part of the transparent film 40 having the curved surface shape is cut off. For example, the cutting may be carried out such that the overall projected shape 30 of the conductive layer 21 on the transparent film 40 is converted to a rectangular shape while maintaining the first electrode 26 and the second electrode 28. In this embodiment, as shown in FIG. 8, the periphery of the transparent film 40 having the curved surface shape is cut along a cutting line L1 to obtain a circular projected shape corresponding to the formed shape, and curved portions 41 at the ends are cut along cutting lines L2 and L3, while maintaining the first electrode 26 and the second electrode 28. Thus, as shown in FIG. 9, a heat generator 20A according to a first specific example is obtained.

It is to be understood that the first electrode 26 and the second electrode 28 may be formed after partially cutting the transparent film 40 having the curved surface shape.

Figure 10:
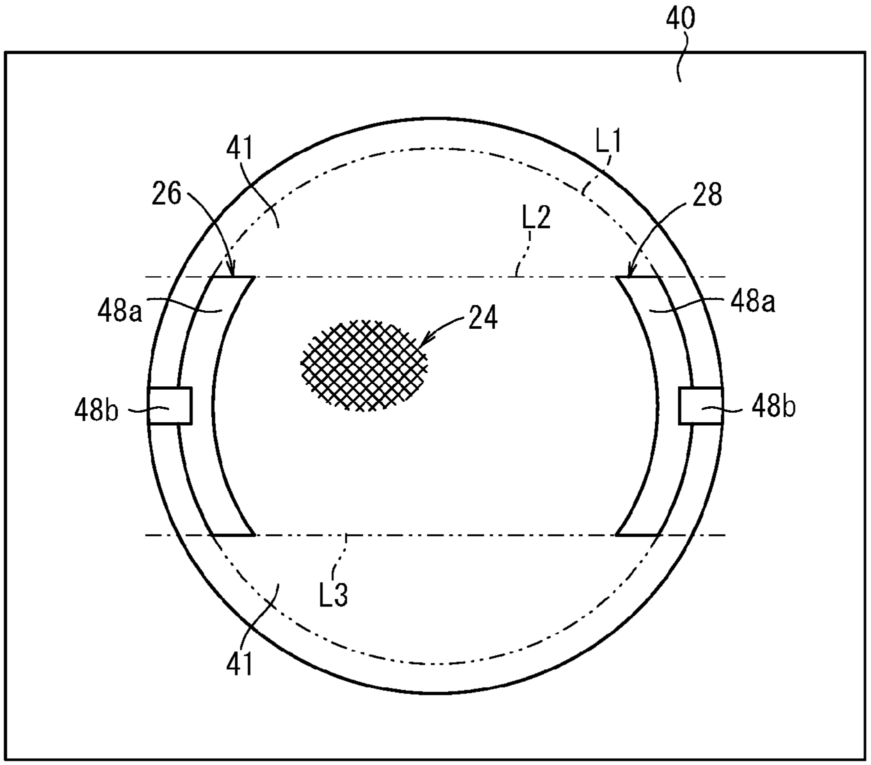
FIG. 10 is a view showing the first and second electrodes formed on the transparent film having the curved surface shape after partially cutting the film in production of a heat generator according to a second specific example.
Figure 11:
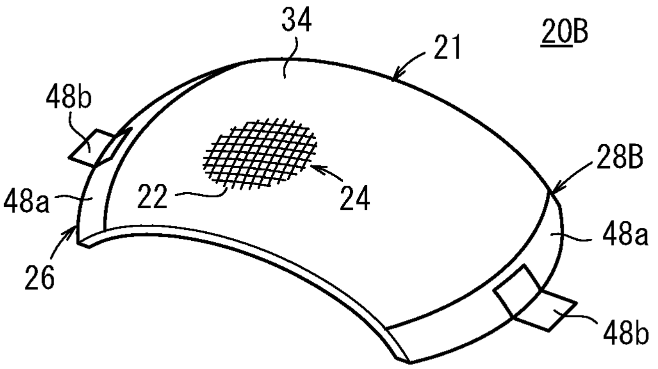
FIG. 11 is a perspective view showing the prepared heat generator of the second specific example.

For example, as shown in FIG. 10, the periphery of the transparent film 40 having the curved surface shape is cut along a cutting line L1 to obtain a circular projected shape corresponding to the formed shape, curved portions 41 at the ends are cut along cutting lines L2 and L3, conductive first copper tapes 48*a* (for forming strip electrodes) are attached onto the periphery of the transparent film 40, and second copper tapes 48*b* (for forming lead-out electrodes) are attached in the direction perpendicular to the first copper tapes 48*a* to form the first electrode 26 and the second electrode 28. The second copper tapes 48*b* are partially overlapped with the first copper tapes 48*a*. Thus, as shown in FIG. 11, a heat generator 20B according to a second specific example is obtained.

Figure 12:
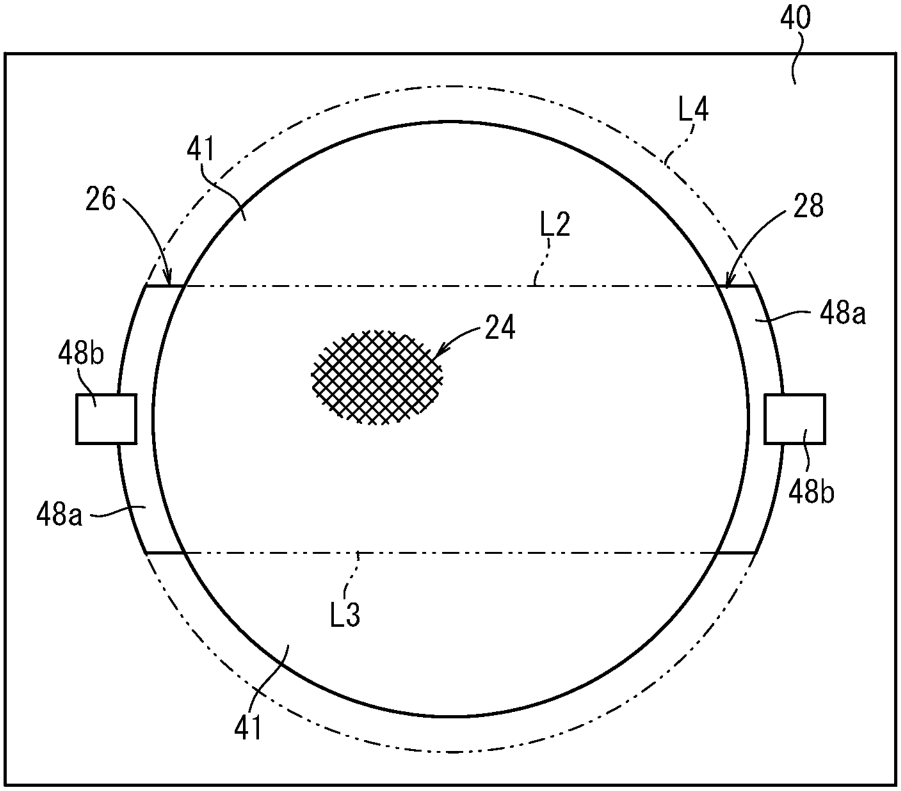
FIG. 12 is a view showing the first and second electrodes formed on the transparent film having the curved surface shape after partially cutting the film in production of a heat generator according to a third specific example.
Figure 13:
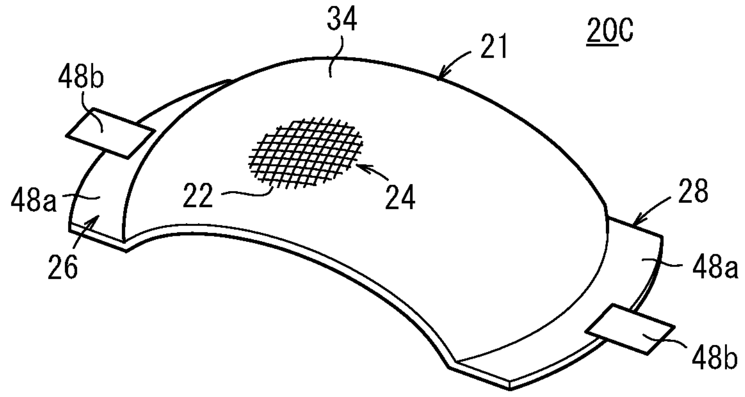
FIG. 13 is a perspective view showing the prepared heat generator of the third specific example.

Alternatively, for example, as shown in FIG. 12, the periphery of the transparent film 40 having the curved surface shape is cut along a cutting line L4 to obtain a circular projected shape with a flat surface portion, curved portions—at the ends are cut along cutting lines L2 and L3, conductive first copper tapes 48*a* (for forming strip electrodes) are attached to the periphery of the flat surface portion in the transparent film 40, and second copper tapes 48*b* (for forming lead-out electrodes) are attached in the direction perpendicular to the first copper tapes 48*a* to form the first electrode 26 and the second electrode 28. The second copper tapes 48*b* are partially overlapped with the first copper tapes 48*a*. Thus, as shown in FIG. 13, a heat generator 20C according to a third specific example is obtained.

The heat generator 20 shown in FIG. 2 and the heat generators 20A to 20C of the first to third specific examples are hereinafter referred to as the heat generator 20.

Figure 14:
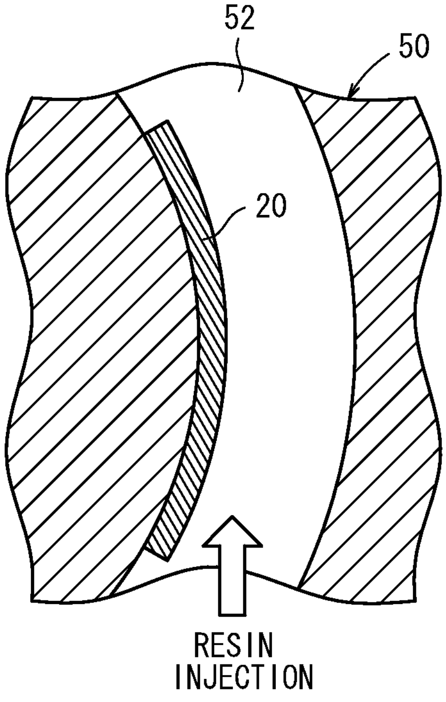
FIG. 14 is a cross-sectional view partially showing the heat generator of the embodiment placed in an injection mold.

As shown in FIG. 14, the heat generator 20 obtained in the above manner is placed in the injection mold 50 for forming the front cover 10. To improve the adhesion, an adhesive film may be incorporated between the heat generator 20 and the mold 50, and a surface of the heat generator 20 may be overcoated with an adhesion improving layer, if necessary.

A molten resin is introduced into a cavity 52 of the injection mold 50, and is hardened therein to obtain the front cover 10 having the integrated heat generator 20 containing the transparent film 40.

Several methods (first to fourth methods) for forming the mesh pattern 24 containing the thin metal wires 22 on the transparent film 40 will be described below with reference to FIGS. 15A to 18.

In the first method, a silver salt emulsion layer is formed, exposed, developed, and fixed on the transparent film 40, to form metallic silver portions for the mesh pattern.

Figure 15A:
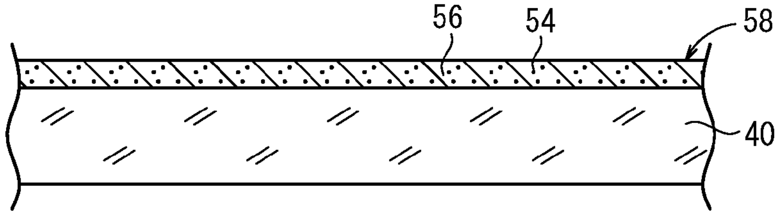
FIGS. 15A to 15E are views showing the process of a method for forming the mesh pattern of the embodiment (a first method)

Specifically, as shown in FIG. 15A, the transparent film 40 is coated with a silver salt emulsion layer 58 containing a mixture of a gelatin 56 and a silver halide 54 (e.g., silver bromide particles, silver chlorobromide particles, or silver iodobromide particles). Though the silver halide 54 is exaggeratingly shown by points in FIGS. 15A to 15C to facilitate understanding, the points do not represent the size, concentration, etc. of the silver halide 54.

Figure 15B:
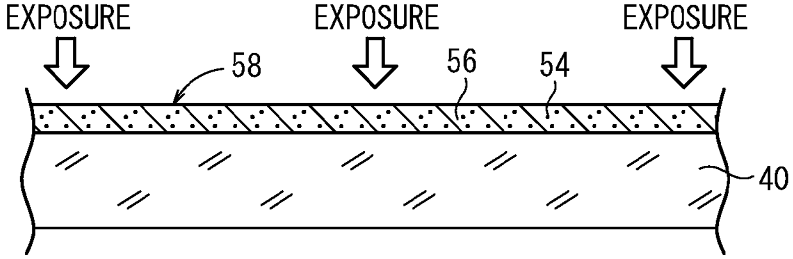

Then, as shown in FIG. 15B, the silver salt emulsion layer 58 is subjected to an exposure treatment for forming the mesh pattern 24. When an optical energy is applied to the silver halide 54, minute silver nuclei are generated to form a latent image invisible to the naked eye.

Figure 15C:
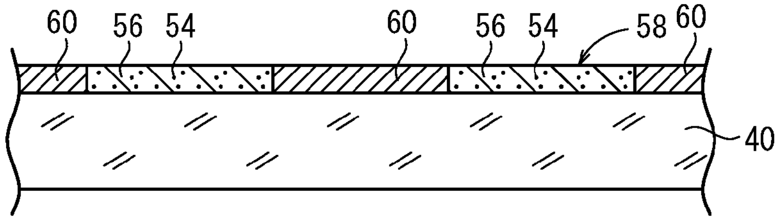

As shown in FIG. 15C, the silver salt emulsion layer 58 is subjected to a development treatment for converting the latent image to an image visible to the naked eye. Specifically, the silver salt emulsion layer 58 having the latent image is developed using a developer, which is an alkaline or acidic solution, generally an alkaline solution. In the development treatment, using the latent image silver nuclei as catalyst cores, silver ions from the silver halide particles or the developer are reduced to metallic silver by a reducing agent (a so-called developing agent) in the developer. As a result, the latent image silver nuclei are grown to form a visible silver image (developed silvers 60).

Figure 15D:
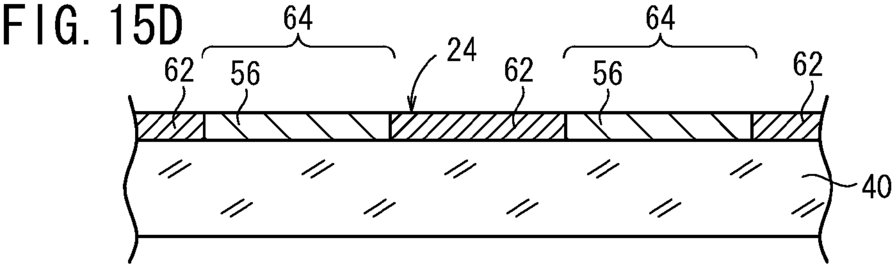

The photosensitive silver halide 54 remains in the silver salt emulsion layer 58 after the development treatment. As shown in FIG. 15D, the silver halide 54 is removed by a fixation treatment using a fixer, which is an acidic or alkaline solution, generally an acidic solution.

After the fixation treatment, metallic silver portions 62 are formed in exposed areas, and light-transmitting portions 64 containing only the gelatin 56 are formed in unexposed areas. Thus, the mesh pattern 24 is formed by the combination of the metallic silver portions 62 and the light-transmitting portions 64 on the transparent film 40.

In a case where silver bromide is used as the silver halide 54 and a thiosulfate salt is used in the fixation treatment, a reaction represented by the following formula proceeds in the treatment.

$$AgBr(solid)+2S_2O_3 \text{ ions} \rightarrow Ag(S_2O_3)_2 \text{ (readily-water-soluble complex)}$$

Two thiosulfate $S_2O_3$ ions and one silver ion (from AgBr) in the gelatin 56 are reacted to generate a silver thiosulfate complex. The silver thiosulfate complex has a high water solubility, and thereby is eluted from the gelatin 56. As a result, the developed silvers 60 are fixed as the metallic silver portions 62. The mesh pattern 24 is formed by the metallic silver portions 62.

Thus, the latent image is reacted with the reducing agent to deposit the developed silvers 60 in the development treatment, and the residual the silver halide 54, not converted to the developed silvers 60, is eluted into water in the fixation treatment. The treatments are described in detail in T. H. James, "The Theory of the Photographic Process, 4th ed.", Macmillian Publishing Co., Inc., NY, Chapter 15, pp. 438-442, 1977.

The development treatment is generally carried out using an alkaline solution. Therefore, the alkaline solution used in the development treatment may be mixed into the fixer (generally an acidic solution), whereby the activity of the fixer may be disadvantageously changed in the fixation treatment. Furthermore, the developer may remain on the film after removing the film from the development bath, whereby an undesired development reaction may be accelerated by the developer. Thus, it is preferred that the silver salt emulsion layer 58 is neutralized or acidified by a quencher such as an acetic acid solution after the development before the fixation.

Figure 15E:
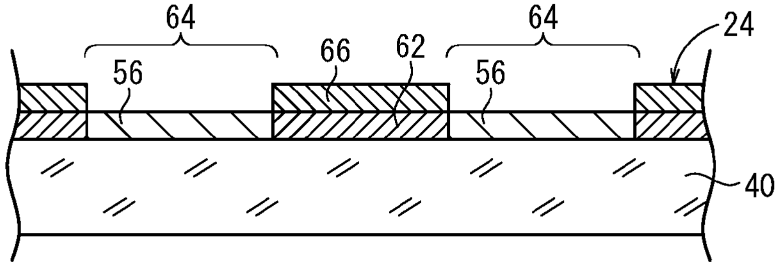

After the metallic silver portions 62 are formed in the above manner, for example, as shown in FIG. 15E, a conductive metal 66 may be disposed only on the metallic silver portion 62 by a plating treatment (such as an electroless plating treatment, an electroplating treatment, or a combination thereof). In this case, the mesh pattern 24 is formed by the metallic silver portions 62 and the conductive metal 66 disposed thereon.

Figure 16A:
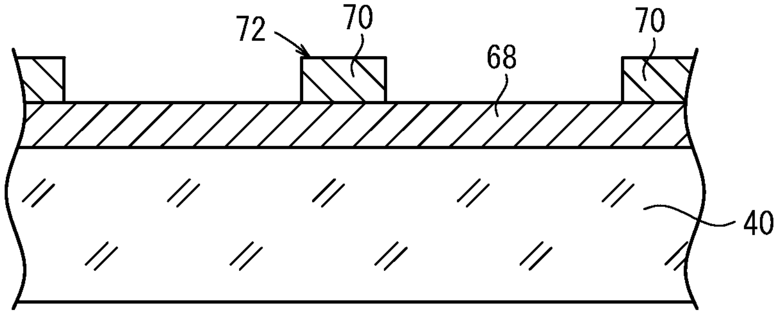
FIGS. 16A and 16B are views showing the process of another method for forming the mesh pattern of the embodiment (a second method)
Figure 16B:
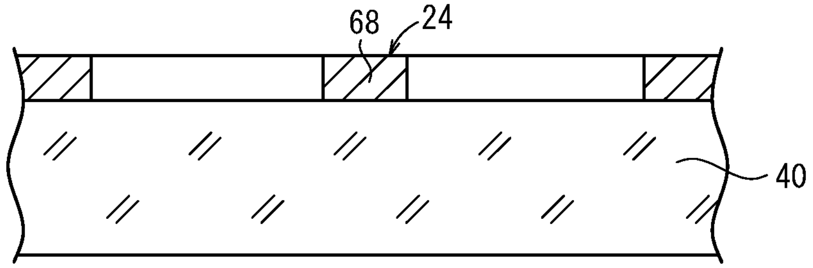

In the second method, for example, as shown in FIG. 16A, a photoresist film 70 is formed on a copper foil 68 disposed on the transparent film 40, and the photoresist film 70 is exposed and developed to form a resist pattern 72. As shown in FIG. 16B, the copper foil 68 exposed from the resist pattern 72 is etched to form the mesh pattern 24 of the copper foil 68.

Figure 17A:
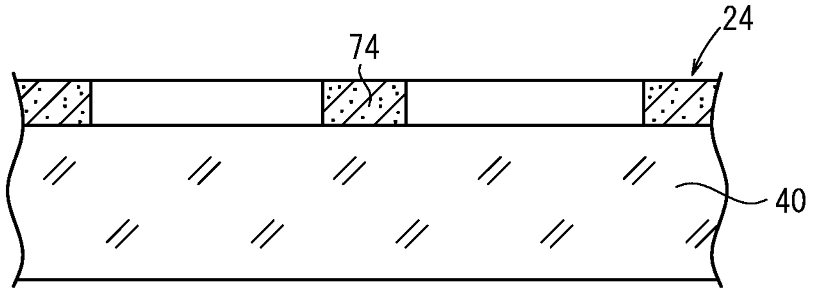
FIGS. 17A and 17B are views showing the process of a further method for forming the mesh pattern of the embodiment (a third method)
Figure 17B:
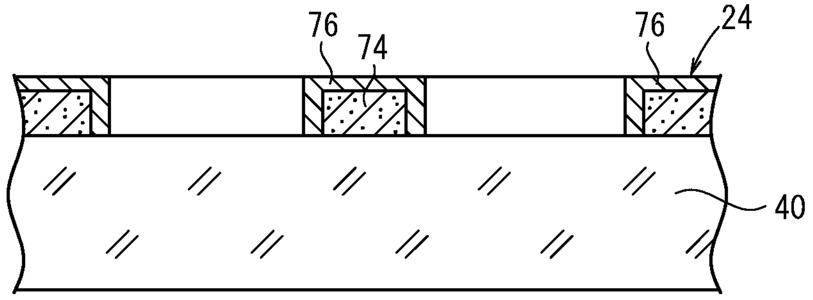

In the third method, as shown in FIG. 17A, a paste 74 containing fine metal particles is printed on the transparent film 40 to form the mesh pattern 24. Of course, as shown in FIG. 17B, the printed paste 74 may be plated with a metal to form a plated metal layer 76. In this case, the mesh pattern 24 is formed by the paste 74 and the plated metal layer 76.

Figure 18:
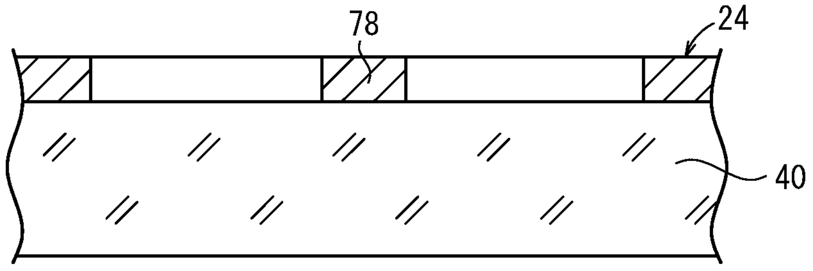
FIG. 18 is a view showing the process of a still further method for forming the mesh pattern of the embodiment (a fourth method)

In the fourth method, as shown in FIG. 18, a thin metal film 78 is printed on the transparent film 40 to form the mesh pattern by using a screen or gravure printing plate.

Among the first to fourth methods, suitable for preparing the heat generator 20 having the curved surface shape is the first method containing exposing, developing, and fixing the silver salt emulsion layer 58 disposed on the transparent film 40 to form the mesh pattern 24 of the metallic silver portions 62.

In the case of using the first method, when the heat generator 20 has an electrical resistance value (initial value) R0 before being stretched and has an electrical resistance value Rb after being stretched by 15%, the heat generator 20 can satisfy the relationship:

$$Rb \leq (2 \times R0).$$

Even when the conductive layer 21 is stretched by 5%, the heat generator 20 of this embodiment can maintain the electrical resistance value relationship of Ra≤(2×R0). Therefore, even when the conductive layer 21 has a curved surface shape after the vacuum forming, local increase or decrease of the resistance value can be prevented, and an approximately expected resistance value distribution can be obtained.

Particularly, in a case where the mesh pattern 24 is formed by exposing and developing the silver salt emulsion layer 58 in the above first method, even when the mesh pattern 24 is stretched by 15%, the heat generator 20 can satisfy the electrical resistance value relationship of Rb≤(2×R0). Therefore, even when the heat generator 20 has a curved surface shape with a large curvature (e.g. a minimum curvature radius of 300 mm or less), wire breaking can be prevented, local increase or decrease of the resistance value can also be prevented, and an approximately expected resistance value distribution can be obtained.

Thus, in the front cover 10 containing the heat generator 20 of this embodiment, the substantially transparent surface heat generation film can be formed on the curved surface, the heat generation uniformity can be improved, the migration problem can be solved, and the transparent heater can be inexpensively formed on the curved-surface body.

Though the heat generator 20 is formed in a part of the surface of the front cover 10 having the entirely curved surface shape in FIG. 1, the front cover 10 may have a partially curved, flat surface shape. The mesh pattern 24 in the heat generator 20 of the embodiment can be flexibly used on such a shape. Furthermore, the mesh pattern 24 can be used on a curved surface shape having a minimum curvature radius of 300 mm or less. Thus, the mesh pattern 24 can be satisfactorily used on various curved-surface front covers without breaking even when the heat generator 20 has a curved surface shape with a minimum curvature radius of 300 mm or less.

A particularly preferred method, which contains using a photographic photosensitive silver halide material for forming the mesh pattern 24 in the heat generator 20 of this embodiment, will be mainly described below.

As described above, the mesh pattern 24 in the heat generator 20 of this embodiment may be prepared as follows. A photosensitive material having the transparent film 40 and thereon the silver salt emulsion layer 58 containing a photosensitive silver halide is exposed and developed, whereby the metallic silver portions 62 and the light-transmitting portions 64 are formed in the exposed areas and the unexposed areas respectively. The metallic silver portions 62 may be subjected to a physical development treatment and/or a plating treatment to deposit the conductive metal 66 thereon if necessary.

The method for forming the mesh pattern 24 includes the following three processes, different in the photosensitive materials and development treatments.

(1) A process containing subjecting a photosensitive black-and-white silver halide material free of physical development nuclei to a chemical or physical development, to form the metallic silver portions 62 on the material.

(2) A process containing subjecting a photosensitive black-and-white silver halide material having a silver halide emulsion layer containing physical development nuclei to a physical development, to form the metallic silver portions 62 on the photosensitive material.

(3) A process containing subjecting a stack of a photosensitive black-and-white silver halide material free of physical development nuclei and an image-receiving sheet having a non-photosensitive layer containing physical development nuclei to a diffusion transfer development, to form the metallic silver portions 62 on the non-photosensitive image-receiving sheet.

In the process of (1), an integral black-and-white development procedure is used to form a transmittable conductive film such as a light-transmitting electromagnetic-shielding film or a light-transmitting conductive film on the photosensitive material. The resulting silver is a chemically or physically developed silver in the form of a high-specific surface area filament, and shows a high activity in the following plating or physical development treatment.

In the process of (2), the silver halide particles are melted around the physical development nuclei and deposited on the nuclei in the exposed areas, to form a transmittable conductive film on the photosensitive material. Also in this process, an integral black-and-white development procedure is used. Though a high activity can be achieved since the silver halide is deposited on the physical development nuclei in the development, the developed silver has a spherical shape with a small specific surface.

In the process of (3), the silver halide particles are melted in the unexposed areas, and diffused and deposited on the development nuclei of the image-receiving sheet, to form a transmittable conductive film on the sheet. In this process, a so-called separate-type procedure is used, and the image-receiving sheet is peeled off from the photosensitive material.

A negative development treatment or a reversal development treatment can be used in the processes. In the diffusion transfer development, the negative development treatment can be carried out using an auto-positive photosensitive material.

The chemical development, thermal development, solution physical development, and diffusion transfer development have the meanings generally known in the art, and are explained in common photographic chemistry texts such as Shin-ichi Kikuchi, "Shashin Kagaku (Photographic Chemistry)", Kyoritsu Shuppan Co., Ltd., 1955 and C. E. K. Mees, "The Theory of Photographic Processes, 4th ed.", Mcmillan, 1977. A liquid treatment is generally used in the present invention, and also a thermal development treatment can be utilized. For example, techniques described in Japanese Laid-Open Patent Publication Nos. 2004-184693, 2004-334077, and 2005-010752 and Japanese Patent Application Nos. 2004-244080 and 2004-085655 can be used in the present invention.

(Photosensitive Material)

[Transparent Film 40]

The transparent film 40 used in the production method of the embodiment may be a flexible plastic film.

In this embodiment, a polyethylene terephthalate film is preferred as the plastic film from the viewpoints of light transmittance, heat resistance, handling, and cost. The material of the plastic film may be appropriately selected depending on the requirement of heat resistance, heat plasticity, etc. When the PET film is formed into a curved surface shape, an unstretched PET film is generally used. However, in the preparation of the photosensitive material according to the present invention, a stretched PET film is used. The stretched PET film cannot be easily processed into the curved surface shape to be described later. Though the unstretched PET film can be processed at about 150° C., the stretched PET film is processed preferably at 170° C. to 250° C., more preferably at 180° C. to 230° C.

[Protective Layer]

In the photosensitive material, a protective layer may be formed on the emulsion layer to be hereinafter described. The protective layer used in this embodiment contains a binder such as a gelatin or a high-molecular polymer, and is formed on the photosensitive emulsion layer to improve the scratch prevention or mechanical property.

[Emulsion Layer]

The photosensitive material used in the production method of this embodiment preferably has the silver salt emulsion layer 58 as a light sensor on the transparent film 40. The emulsion layer according to the embodiment may contain a dye, a binder, a solvent, etc. in addition to the silver salt, if necessary.

<Silver Salt>

The silver salt used in this embodiment is preferably an inorganic silver salt such as a silver halide. It is particularly preferred that the silver salt is used in the form of particles for the photographic photosensitive silver halide material. The silver halide has an excellent light sensing property.

The silver halide, preferably used in the photographic emulsion of the photographic photosensitive silver halide material, will be described below.

In this embodiment, the silver halide is preferably used as a light sensor. Silver halide technologies for photographic silver salt films, photographic papers, print engraving films, emulsion masks for photomasking, and the like may be utilized in this embodiment.

The silver halide may contain a halogen element of chlorine, bromine, iodine, or fluorine, and may contain a combination of the elements. For example, the silver halide preferably contains AgCl, AgBr, or AgI, more preferably contains AgBr or AgCl, as a main component. Also silver chlorobromide, silver iodochlorobromide, or silver iodobromide is preferably used as the silver halide. The silver halide is further preferably silver chlorobromide, silver bromide, silver iodochlorobromide, or silver iodobromide, most preferably silver chlorobromide or silver iodochlorobromide having a silver chloride content of 50 mol % or more.

The term "the silver halide contains AgBr (silver bromide) as a main component" means that the mole ratio of bromide ion is 50% or more in the silver halide composition. The silver halide particle containing AgBr as a main component may contain iodide or chloride ion in addition to the bromide ion.

<Binder>

The binder may be used in the emulsion layer to uniformly disperse the silver salt particles and to help the emulsion layer adhere to a support. In the present invention, the binder may contain a water-insoluble or water-soluble polymer, and preferably contains a water-soluble polymer.

Examples of the binders include gelatins, polyvinyl alcohols (PVA), polyvinyl pyrolidones (PVP), polysaccharides such as starches, celluloses and derivatives thereof, polyethylene oxides, polysaccharides, polyvinylamines, chitosans, polylysines, polyacrylic acids, polyalginic acids, polyhyaluronic acids, and carboxycelluloses.

The amount of the binder in the emulsion layer is controlled preferably such that the silver/binder volume ratio of the silver salt emulsion layer is 1/4 or more, more preferably such that the silver/binder volume ratio is 1/2 or more.

The silver/binder volume ratio of the silver salt emulsion layer may be appropriately selected depending on the purpose of the formed body and a calender treatment.

When the thin metal wires formed by exposing and developing the silver salt emulsion layer are subjected to a calender treatment, the silver/binder volume ratio is preferably 2/1 or more, more preferably 2/1 to 6/1, further preferably 2/1 to 4/1. In this case, the applied silver amount of the silver salt emulsion layer is preferably 8 $g/m^2$ or more, more preferably 8 to 20 $g/m^2$.

When the thin metal wires formed by exposing and developing the silver salt emulsion layer are not subjected to a calender treatment, the silver/binder volume ratio is preferably less than 2/1, more preferably 1/2 to 1.5/1, further preferably 1/1.5 to 1.5/1. In this case, the applied silver amount of the silver salt emulsion layer is preferably less than 20 $g/m^2$, more preferably 6 to 15 g/m2, further preferably 7.5 to 15 $g/m^2$.

<Solvent>

The solvent used for forming the emulsion layer is not particularly limited, and examples thereof include water, organic solvents (e.g. alcohols such as methanol, ketones such as acetone, amides such as formamide, sulfoxides such as dimethyl sulfoxide, esters such as ethyl acetate, ethers), ionic liquids, and mixtures thereof.

In the present invention, the mass ratio of the solvent to the total of the silver salt, the binder, etc. in the silver salt emulsion layer is 30% to 90% by mass, preferably 50% to 80% by mass.

Each process for forming the mesh pattern 24 will be described below.

[Exposure]

In this embodiment, the photosensitive material having the silver salt emulsion layer 58 formed on the transparent film 40 is subjected to the exposure treatment. The exposure may be carried out using an electromagnetic wave. For example, a light (such as a visible light or an ultraviolet light) or a radiation ray (such as an X-ray) may be used to generate the electromagnetic wave. The exposure may be carried out using a light source having a wavelength distribution or a specific wavelength.

The exposure for forming a pattern image may be carried out using a surface exposure method or a scanning exposure method. In the surface exposure method, the photosensitive surface is irradiated with a uniform light through a mask to form an image of a mask pattern. In the scanning exposure method, the photosensitive surface is scanned with a beam of a laser light or the like to form a patterned irradiated area. It is most preferred that the exposure is carried out using a semiconductor laser from the viewpoints of utilizing an apparatus with compact size, inexpensive price, high durability, and high stability,

[Development Treatment]

In this embodiment, the emulsion layer is subjected to the development treatment after the exposure. Common development treatment technologies for photographic silver salt films, photographic papers, print engraving films, emulsion masks for photomasking, and the like may be used in the present invention. The developer used in the development treatment is not particularly limited, and may be a PQ developer, an MQ developer, an MAA developer, etc. Examples of commercially available developers usable in the present invention include CN-16, CR-56, CP45X, FD-3, and PAPITOL available from FUJIFILM Corporation, C-41, E-6, RA-4, D-19, and D-72 available from Eastman Kodak Company, and developers contained in kits thereof. The developer may be a lith developer.

Examples of the lith developers include D85 available from Eastman Kodak Company. In the present invention, by the above exposure and development treatments, the metallic silver portion (preferably the patterned metallic silver portion) is formed in the exposed area, and the light-transmitting portion is formed in the unexposed area.

The mass ratio of the metallic silver contained in the exposed area after the development to the silver contained in this area before the exposure is preferably 50% or more, more preferably 80% or more by mass. When the mass ratio is 50% or more by mass, a high conductivity can be obtained.

[Physical Development and Plating Treatment]

In this embodiment, to increase the conductivity of the metallic silver portion 62 formed by the above exposure and development, conductive metal particles may be deposited thereon by a physical development treatment and/or a plating treatment. The conductive metal particles may be deposited on the metallic silver portion 62 by only one of the physical development and plating treatments or by the combination of the treatments.

[Calender Treatment]

The metallic silver portion 62 (the entire-surface metallic silver portion, mesh-patterned metal portion, or wiring-patterned metal portion) may be subjected to a calender treatment after the development treatment. The metallic silver portion 62 can be smoothed and the conductivity thereof can be significantly increased by the calender treatment. The calender treatment may be carried out using a calender roll, generally a pair of rolls.

The roll used in the calender treatment may be a metal roll or a plastic roll such as an epoxy, polyimide, polyamide, or polyimide-amide roll. Particularly when the photosensitive material has the emulsion layer on both sides, it is preferably treated with a pair of the metal rolls. When the photosensitive material has the emulsion layer only on one side, it may be treated with the combination of the metal roll and the plastic roll in view of preventing wrinkling. The line pressure is preferably 1960 N/cm (200 kgf/cm, corresponding to a surface pressure of 699.4 kgf/cm2) or more, more preferably 2940 N/cm (300 kgf/cm, corresponding to a surface pressure of 935.8 $kgf/cm^2$) or more. The upper limit of the line pressure is 6880 N/cm (700 kgf/cm) or less.

The temperature, at which the smoothing treatment such as the calender treatment is carried out, is preferably 10° C. (without temperature control) to 100° C. Though the preferred temperature range depends on the density and shape of the mesh or wiring metal pattern, the type of the binder, etc., the temperature is more preferably 10° C. (without temperature control) to 50° C. in general.

[Vapor Contact Treatment]

The effect of the calender treatment can be improved by bringing the metallic silver portion 62 into contact with vapor immediately before or after the calender treatment. Thus, the conductivity can be further significantly improved by the vapor contact treatment. The temperature of the vapor used in the treatment is preferably 80° C. or higher, more preferably 100° C. to 140° C. The vapor contact time is preferably about 10 seconds to 5 minutes, more preferably 1 to 5 minutes.

The present invention may be appropriately combined with technologies described in the following patent publications and international patent pamphlets shown in Tables 1 and 2. "Japanese Laid-Open Patent", "Publication No.", "Pamphlet No.", and the like are omitted.

TABLE 1

| | | | | |
|---|---|---|---|---|
| 2004-221564 | 2004-221565 | 2007-200922 | 2006-352073 | 2007-129205 |
| 2007-235115 | 2007-207987 | 2006-012935 | 2006-010795 | 2006-228469 |
| 2006-332459 | 2007-207987 | 2007-226215 | 2006-261315 | 2007-072171 |
| 2007-102200 | 2006-228473 | 2006-269795 | 2006-269795 | 2006-324203 |
| 2006-228478 | 2006-228836 | 2007-009326 | 2006-336090 | 2006-336099 |
| 2006-348351 | 2007-270321 | 2007-270322 | 2007-201378 | 2007-335729 |
| 2007-134439 | 2007-149760 | 2007-208133 | 2007-178915 | 2007-334325 |
| 2007-310091 | 2007-116137 | 2007-088219 | 2007-207883 | 2007-013130 |
| 2005-302508 | 2008-218784 | 2008-227350 | 2008-227351 | 2008-244067 |
| 2008-267814 | 2008-270405 | 2008-277675 | 2008-277676 | 2008-282840 |
| 2008-283029 | 2008-288305 | 2008-288419 | 2008-300720 | 2008-300721 |
| 2009-4213 | 2009-10001 | 2009-16526 | 2009-21334 | 2009-26933 |
| 2008-147507 | 2008-159770 | 2008-159771 | 2008-171568 | 2008-198388 |
| 2008-218096 | 2008-218264 | 2008-224916 | 2008-235224 | 2008-235467 |
| 2008-241987 | 2008-251274 | 2008-251275 | 2008-252046 | 2008-277428 |
| 2009-21153 | | | | |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

MODIFICATION EXAMPLES

Several modification examples of the heat generator 20 used in the front cover 10 of this embodiment will be described below.

A heat generator according to a first modification example has a carbon nanotube layer containing a large number of dispersed carbon nanotubes instead of the mesh pattern 24 containing the thin metal wires 22. In this example, the amount and dispersion ratio of the carbon nanotubes are preferably controlled so that the heat generator 20 has a surface resistance of 10 to 500 ohm/sq and an electrical resistance of 12 to 120 ohm.

For example, the carbon nanotubes may be used in the form of a carbon nanotube dispersion described in Japanese Patent No. 3665969.

The carbon nanotubes include straight and curved multi-walled carbon nanotubes (MWNTs), straight and curved double-walled carbon nanotubes (DWNTs), straight and curved single-walled carbon nanotubes (SWNTs), and various compositions thereof, and common by-products obtained in carbon nanotube production described in U.S. Pat. No. 6,333,016 and WO 01/92381 A1, etc. The carbon nanotubes may have an outer diameter of 0.5 nm or more and less than 3.5 nm, and may have an aspect ratio of 10 to 2000.

Among the above described carbon nanotubes, the SWNTs are highly flexible and are spontaneously aggregated to form a carbon nanotube rope. Even when the SWNTs are used in a small amount, the carbon nanotube layer containing the SWNT rope exhibits a high conductivity. Therefore, the carbon nanotube layer can have excellent transparency and low haze. Thus, the excellent conductivity and transparency can be obtained using only a small amount of the carbon nanotubes. The amount of the carbon nanotubes in the carbon nanotube layer is about 0.001% to 1% by weight, preferably about 0.01% to 0.1% by weight.

The carbon nanotube layer may contain a surfactant and/or a polymer material in addition to the carbon nanotubes. The polymer material may be selected from natural and synthetic polymer resins depending on the desired strength, structure, and design requirement for the intended purpose. For example, the polymer material may contain one selected from the group consisting of thermoplastic resins, thermosetting polymers, elastomers, and combinations thereof. Thus, the polymer material may contain one selected from the group consisting of polyethylenes, polypropylenes, polyvinyl chlorides, styrene resins, polyurethanes, polyimides, polycarbonates, polyethylene terephthalates, celluloses, gelatins, chitins, polypeptides, polysaccharides, polynucleotides, polyoxyethylenes, polyoxypropylenes, polyvinyl alcohols, polyvinyl acetates, polyvinyl pyrolidones, and mixtures thereof. Furthermore, the polymer material may contain one selected from the group consisting of ceramic composite polymers, phosphine oxides, and chalcogenides.

The carbon nanotube layer can be easily formed. For example, a dispersion containing only the carbon nanotubes in a solvent such as acetone, water, an ether, or an alcohol may be disposed on the transparent film (40), and the solvent may be removed by a general method such as air drying, heating, or decompressing to form the desired carbon nanotube layer. The carbon nanotube layer may be applied by another known method such as spray coating, dip coating, spin coating, knife coating, kiss coating, gravure coating, screen printing, inkjet printing, pad printing, another printing, or roll coating.

The carbon nanotube film may be overcoated with an inorganic or organic polymer material. Of course it may be overcoated with a layer of a conductive material such as indium tin oxide (ITO), antimony tin oxide (ATO), fluorine-doped tin oxide (FTO), or aluminum-doped zinc oxide (FZO) to increase the charge dispersion or transfer rate. Furthermore, it may be overcoated with a UV absorbing layer such as a zinc oxide (ZnO) layer, a doped oxide layer, a silicon layer, etc.

The carbon nanotube layer may further contain a substance such as a plasticizer, a softener, a filler, a stiffener, a processing aid, a stabilizer, an antioxidant, a disperser, a binder, a crosslinker, a colorant, a UV absorber, or a charge regulator.

The carbon nanotube layer may further contain another conductive organic material, a conductive inorganic material, or a combination thereof. The conductive organic materials include buckyballs, carbon blacks, fullerenes, carbon nanotubes having an outer diameter of more than about 3.5 nm, and particles containing a combination or mixture thereof.

The conductive inorganic materials include aluminum, antimony, beryllium, cadmium, chromium, cobalt, copper, doped metal oxides, iron, gold, lead, manganese, magnesium, mercury, metal oxides, nickel, platinum, silver, steels, titanium, zinc, and particles containing a combination or mixture thereof. Preferred conductive materials include indium tin oxide, antimony tin oxide, fluorine-doped tin oxide, aluminum-doped zinc oxide, and combinations and mixtures thereof. Furthermore, the carbon nanotube layer may contain a fluid, a gelatin, an ionic compound, a semiconductor, a solid, a surfactant, or a combination or mixture thereof.

A heat generator according to a second modification example has a metal nanomaterial layer containing a large number of dispersed metal nanomaterials having a diameter of 2 μm or less instead of the mesh pattern 24 containing the thin metal wires 22. The metal nanomaterials preferably have a diameter of 1 μm or less, more preferably have a diameter of 0.5 μm or less. Also in this example, the amount and dispersion ratio of the metal nanomaterials are preferably controlled so that the heat generator 20 has a surface resistance of 10 to 500 ohm/sq and an electrical resistance of 12 to 120 ohm. The metal nanomaterials include metal nanorods, metal nanowires, metal nanofibers, metal nanoribbons, and metal nanobelts.

Then, a curved-surface body 150 according to this embodiment will be described below with reference to FIGS. 19 to 26.

Figure 19:
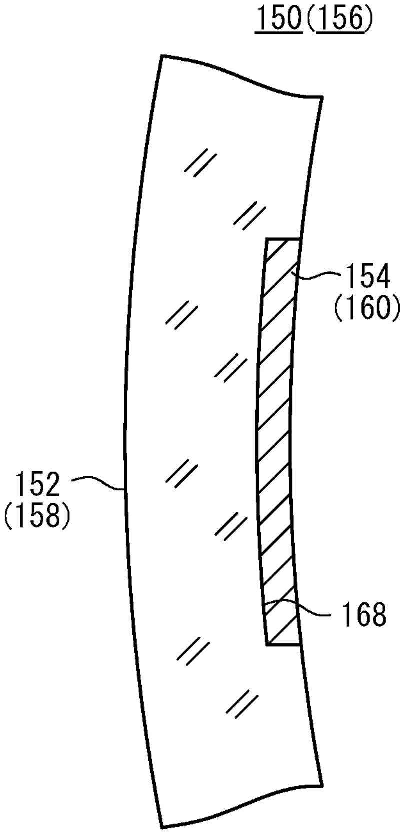
FIG. 19 is a cross-sectional view partially showing a usage of a curved-surface body (a lighting device) according to the embodiment.

As shown in FIG. 19 with partial omission, the curved-surface body 150 contains a transparent substrate 152 having a three-dimensional curved surface and a transparent conductor 154 having a three-dimensional curved surface. When the curved-surface body 150 is used as a lighting device 156 and the substrate 152 is used as a transparent lighting cover 158, an EL (electroluminescence) device 160 or the like is mounted in the lighting cover 158 as the transparent conductor 154.

Figure 20:
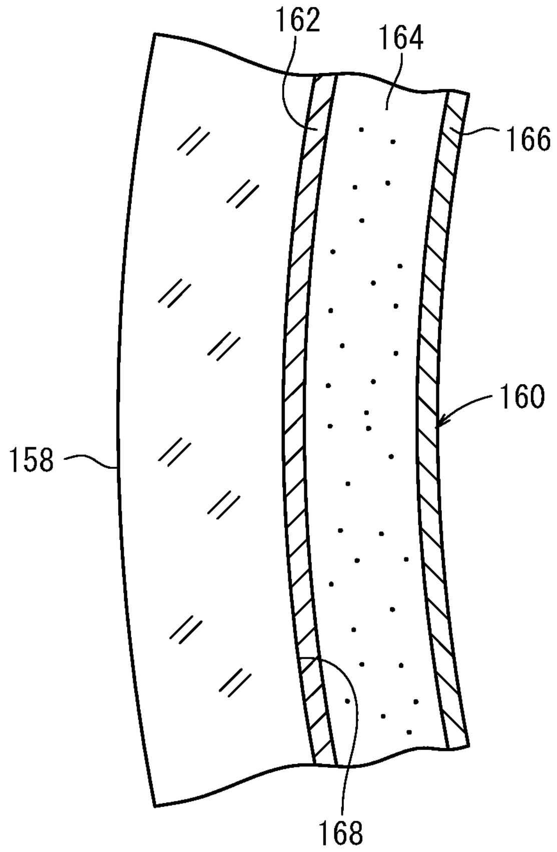
FIG. 20 is an enlarged cross-sectional view partially showing the lighting device of the embodiment.

As shown in FIG. 20, the EL device 160 has a conductive film 162, a light-emitting layer 164 (e.g. a fluorescent layer) stacked thereon with a dielectric layer (not shown) in between, and a back electrode 166 (e.g. an aluminum layer) stacked thereon with a dielectric layer (not shown) in between. In FIGS. 19 and 20, the EL device 160 is embedded in the lighting cover 158 such that the conductive film 162 faces the bottom of a concave portion 168 in the lighting cover 158 and the back electrode 166 is exposed to the outside.

Figure 21:
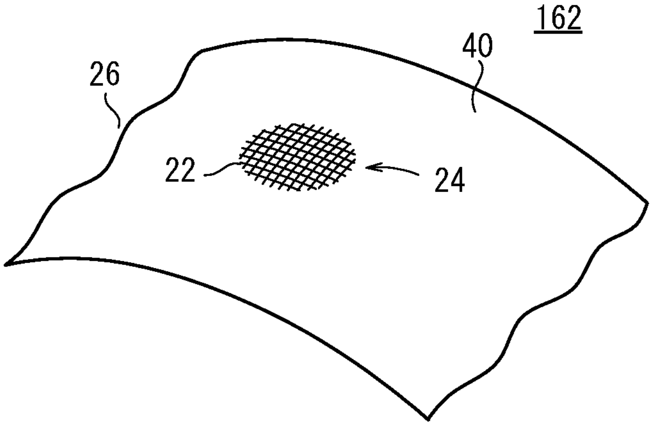
FIG. 21 is a perspective view partially showing a conductive film according to the embodiment.

As shown in FIG. 21, the conductive film 162 has a mesh pattern 24 containing conductive thin metal wires 22 with a large number of lattice intersections on one main surface of the transparent film 40. A transparent conductive resin (not shown) is applied to the main surface having the mesh pattern 24 (the mesh surface).

A method for producing the lighting device 156 will be described below with reference to FIGS. 22 to 26.

Figure 22:
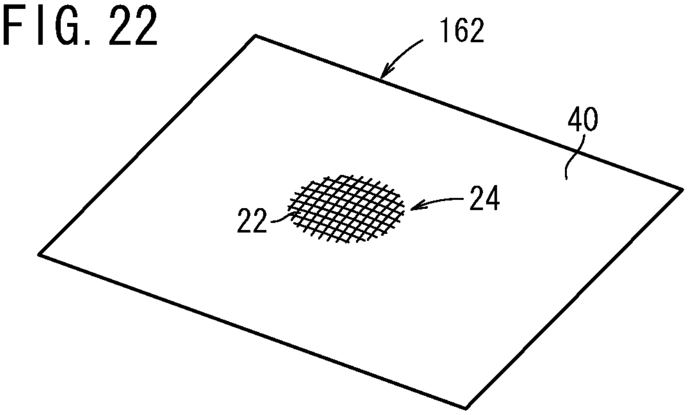
FIG. 22 is a perspective view showing the conductive film prepared by forming a mesh pattern on a transparent film.

First, as shown in FIG. 22, the mesh pattern 24 containing the conductive thin metal wires 22 with a large number of lattice intersections is formed on an insulating transparent film 40. Then, the transparent conductive resin is applied to the mesh surface to obtain the conductive film 162.

Figure 23:
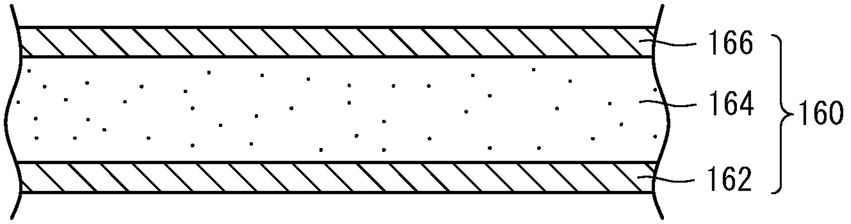
FIG. 23 is a cross-sectional view partially showing a plate-shaped EL device prepared by stacking the conductive film, a light-emitting layer, a back electrode, etc.

As shown in FIG. 23, the light-emitting layer 164 is stacked on the conductive film 162 with a dielectric layer (not shown) in between, and the back electrode 166 is stacked on the light-emitting layer 164 with a dielectric layer (not shown) in between, to obtain the plate-shaped EL device 160.

Figure 24A:
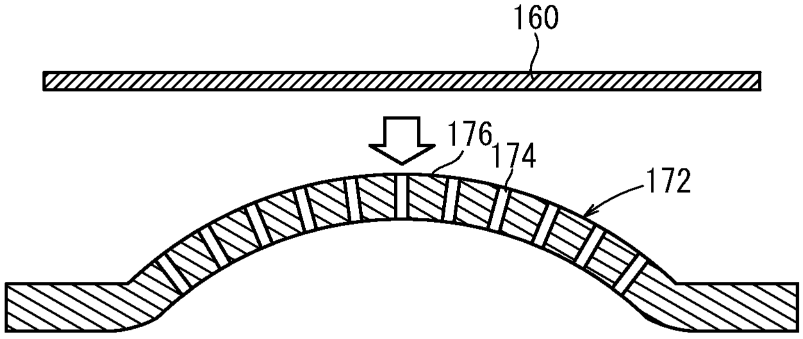
FIG. 24A is a cross-sectional view partially showing a forming mold for vacuum shape forming of the EL device.

As shown in FIG. 24A, the EL device 160 is formed under vacuum into a curved surface shape corresponding to the surface shape of the lighting cover 158. The vacuum forming is carried out using a forming mold 172 having approximately the same dimension as an injection mold 170 for injection forming of the lighting cover 158 (see FIG. 26). As shown in FIG. 24A, when the lighting cover 158 has a three-dimensional curved surface, the forming mold 172 has a similar curved surface (an inverted curved surface in this case) and a large number of vacuum vents 174. For example, when the lighting cover 158 has a concave curved surface, the forming mold 172 has such a dimension that a convex curved surface 176 thereof is fitted into the concave curved surface of the lighting cover 158.

Figure 24B:
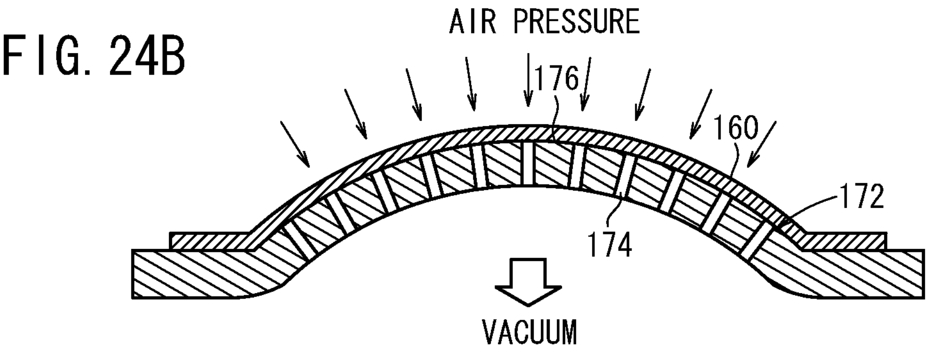
FIG. 24B is a cross-sectional view showing the EL device pressed to the mold.
Figure 25:
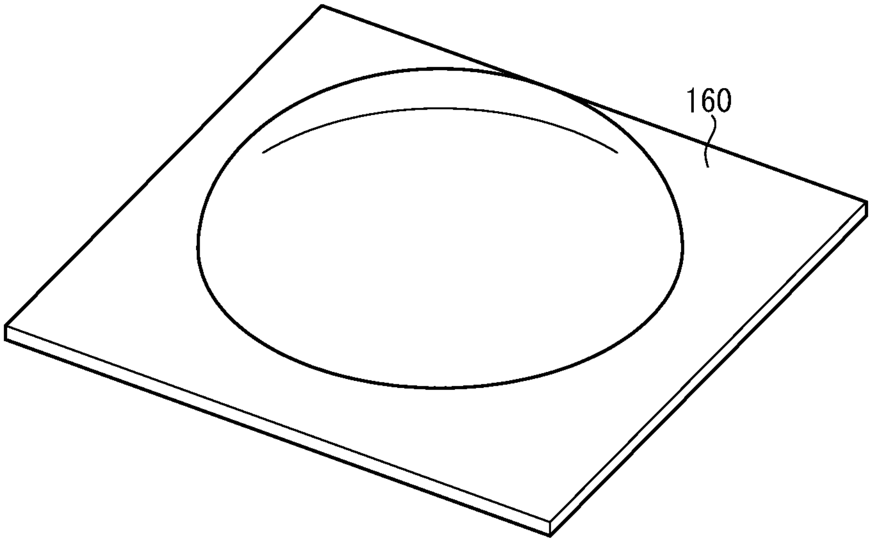
FIG. 25 is a perspective view showing the EL device having a curved surface shape formed using the forming mold under vacuum.

The vacuum forming of the EL device 160 may be carried out using the forming mold 172 as follows. For example, as shown in FIG. 24A, the EL device 160 is preheated at 140° C. to 210° C. Then, as shown in FIG. 24B, the EL device 160 is pressed to the convex curved surface 176 of the forming mold 172, and an air pressure of 0.1 to 2 MPa is applied to the EL device 160 by vacuuming air through the vacuum vents 174 in the forming mold 172. As shown in FIG. 25, the EL device 160 having the curved surface shape corresponding to the lighting cover 158 is obtained by the vacuum forming. Then, an unnecessary part of the EL device 160 may be cut off, as required.

Figure 26:
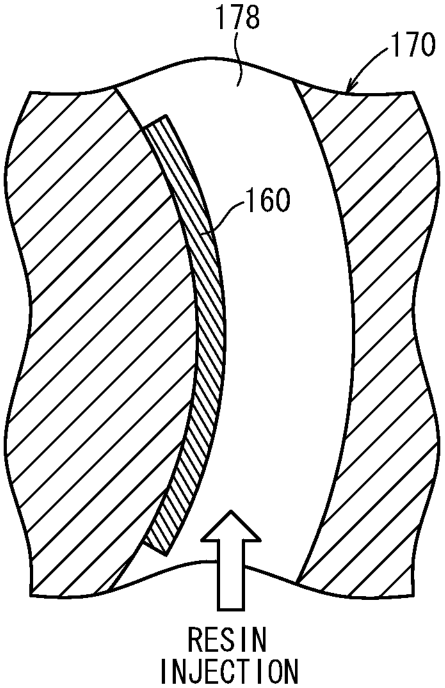
FIG. 26 is a cross-sectional view partially showing the EL device of the embodiment placed in an injection mold.

As shown in FIG. 26, the EL device 160 is placed in the injection mold 170 for forming the lighting cover 158. To improve the adhesion, an adhesive film may be incorporated between the EL device 160 and the mold 170, and a surface of the EL device 160 may be overcoated with an adhesion improving layer, if necessary.

A molten resin is introduced into a cavity 178 of the injection mold 170, and is hardened therein to obtain the lighting device 156 having the lighting cover 158 and the integrated EL device 160 shown in FIG. 19.

The above described first to fourth methods can be preferably used for forming the mesh pattern 24 containing the thin metal wires 22 on the transparent film 40.

Even when the transparent conductor 154 of this embodiment (the EL device 160 in the above example) is stretched by 5%, it can maintain the electrical resistance value relationship of Ra≤(2×R0). Therefore, even when the transparent conductor 154 has a curved surface shape after the vacuum forming, local increase or decrease of the resistance value can be prevented, and an approximately expected resistance value distribution can be obtained.

In a case where the mesh pattern 24 is formed by exposing and developing the silver salt emulsion layer 58 in the above first method, even when the mesh pattern 24 is stretched by 15%, it can satisfy the electrical resistance value relationship of Rb≤(2×R0). Therefore, even when the transparent conductor 154 has a curved surface shape with a large curvature (e.g. a minimum curvature radius of 300 mm or less), the curved-surface body 150 having an excellent conductivity can be formed without wire breaking, and the display or lighting device having a three-dimensional curved display surface can be obtained at low cost.

Though the EL device 160 is formed in a part of the lighting cover 158 having the entirely curved surface shape in FIG. 19, the lighting cover 158 may have a partially curved, flat surface shape. The EL device 160 of the embodiment can be flexibly used on such a shape. Furthermore, the EL device 160 can be used on a curved surface shape having a minimum curvature radius of 300 mm or less. Thus, the EL device 160 can be satisfactorily used on various curved-surface lighting covers without breaking the mesh pattern 24 even when the curved surface shape has a minimum curvature radius of 300 mm or less.

The conductive film 162 may have a carbon nanotube layer containing a large number of dispersed carbon nanotubes instead of the mesh pattern 24 containing the thin metal wires 22, as the above heat generator of the first modification example. In this case, the amount and dispersion ratio of the carbon nanotubes are preferably controlled so that the conductive film 162 has a surface resistance of 10 to 500 ohm/sq and an electrical resistance of 12 to 120 ohm.

The conductive film 162 may have a metal nanomaterial layer containing a large number of dispersed metal nanomaterials instead of the mesh pattern 24 containing the thin metal wires 22, as the heat generator of the second modification example. Also in this case, the amount and dispersion ratio of the metal nanomaterials are preferably controlled so that the conductive film 162 has a surface resistance of 10 to 500 ohm/sq and an electrical resistance of 12 to 120 ohm.

EXAMPLES

The present invention will be described more specifically below with reference to Examples. Materials, amounts, ratios, treatment contents, treatment procedures, and the like used in Examples may be appropriately changed without departing from the scope of the invention. The following specific examples are therefore to be considered in all respects as illustrative and not restrictive.

First Example

A front cover containing a heat generator 20 according to Example 1 and a front cover according to Reference Example 1 were produced, and the electrode distances and the temperature distributions thereof were measured to confirm the effects of the embodiment.

Example 1

<Formation of Mesh Pattern 24 (Exposure and Development of Silver Salt Emulsion Layer)>

An emulsion containing an aqueous medium, a gelatin, and silver iodobromide particles was prepared. The amount of the gelatin was 7.5 g per 60 g of Ag (silver) in the aqueous medium, and the silver iodobromide particles had an I content of 2 mol % and an average spherical equivalent diameter of 0.05 μm. The emulsion had an Ag/gelatin volume ratio of 1/1, and the gelatin was a low-molecular gelatin having an average molecular weight of 20000.

$K_3Rh_2Br_9$ and $K_2IrCl_6$ were added to the emulsion at a concentration of 10−7 mol/mol-silver to dope the silver bromide particles with Rh and Ir ions. $Na_2PdCl_4$ was further added to the emulsion, and the resultant emulsion was subjected to gold-sulfur sensitization using chlorauric acid and sodium thiosulfate. The emulsion and a gelatin hardening agent were applied to a polyethylene terephthalate (PET) such that the amount of the applied silver was 1 g/m². The PET was hydrophilized before the application. The coating was dried and exposed to an ultraviolet lamp using a photomask having a lattice-patterned space (line/space=285 μm/15 μm (pitch 300 μm)) capable of forming a patterned developed silver image (line/space=15 μm/285 μm). Then the coating was developed using the following developer at 25° C. for 45 seconds, fixed using the fixer SUPER FUJIFIX available from FUJIFILM Corporation, and rinsed with pure water. Thus obtained transparent film 40 having a mesh pattern 24 had a surface resistance of 40 ohm/sq.

[Developer Composition]

1 L of the developer contained the following compounds.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

<Vacuum Forming>

The above transparent film 40 having the mesh pattern 24 was formed under vacuum using a forming mold 42 (see FIGS. 6A and 6B). The forming mold 42 had a shape provided by cutting off a part of a sphere having a radius of 100 mm, and had a diameter of 110 mm. In the vacuum forming, the transparent film 40 was preheated for 5 seconds by a hot plate at 195° C. and then immediately pressed onto the forming mold 42, and an air pressure of 0.7 MPa was applied to on the side of the transparent film 40 while vacuuming from the forming mold 42. Thus, the transparent film 40 was formed into an entirely curved surface shape.

<Formation of First Electrode 26 and Second Electrode 28>

A conductive copper tape having a width of 12.5 mm and a length of 70 mm (a first copper tape 48_a_, No. 8701 available from Sliontec Corporation, throughout Examples) was attached to each of the opposite ends of the transparent film 40 having the curved surface shape. The first copper tapes 48*a* were arranged approximately parallel to each other. A conductive copper tape having a width of 15 mm and a length of 25 mm (a second copper tape 48*b*) was further attached in the direction perpendicular to each first copper tape 48*a*. The second copper tapes 48*b* were partially overlapped with the first copper tapes 48*a*. Thus, a pair of electrodes (a first electrode 26 and a second electrode 28) were formed.

<Cutting Treatment: Production of Heat Generator 20>

As shown in FIG. 8, the periphery of the transparent film 40 having the curved surface shape, on which the mesh pattern 24, the first electrode 26, and the second electrode 28 were formed, was cut along a cutting line L1 corresponding to the formed shape while maintaining the first electrode 26 and the second electrode 28, to obtain a circular projected shape having a diameter of 110 mm. Furthermore, 20-mm curved portions 41 at the ends were cut off along cutting lines L2 and L3 while maintaining the first electrode 26 and the second electrode 28. Thus, as shown in FIG. 9, a heat generator 20A having a curved surface shape was produced. The heat generator 20A had an approximately rectangular projected shape, and had the first electrode 26 and the second electrode 28 on the short sides.

<Injection Forming: Production of Front Cover 10>

Figure 27:
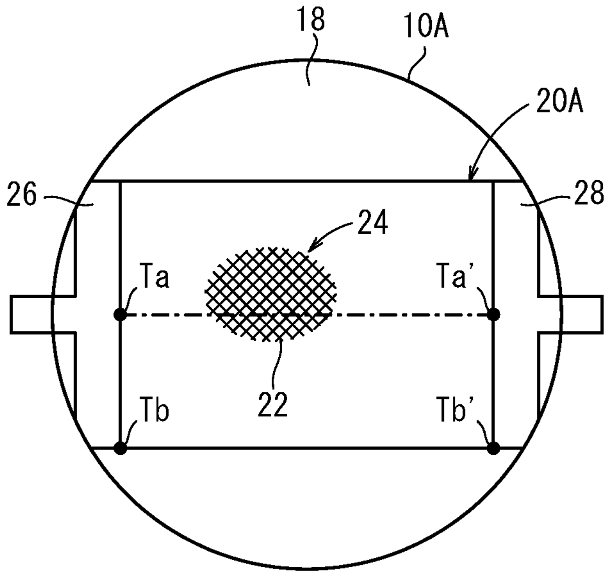
FIG. 27 is a plan view showing a front cover according to Example 1.

As shown in FIG. 14, the heat generator 20 having the curved surface shape was placed in an injection mold 50 for forming a front cover 10, and a polycarbonate melted at 300° C. was introduced into a cavity 52 thereof. Thus, as shown in FIG. 27, a front cover 10A according to Example 1 having a thickness of 2 mm was produced. The injection mold 50 was used under a temperature of 95° C. and a forming cycle of 60 seconds.

Reference Example 1

Figure 28:
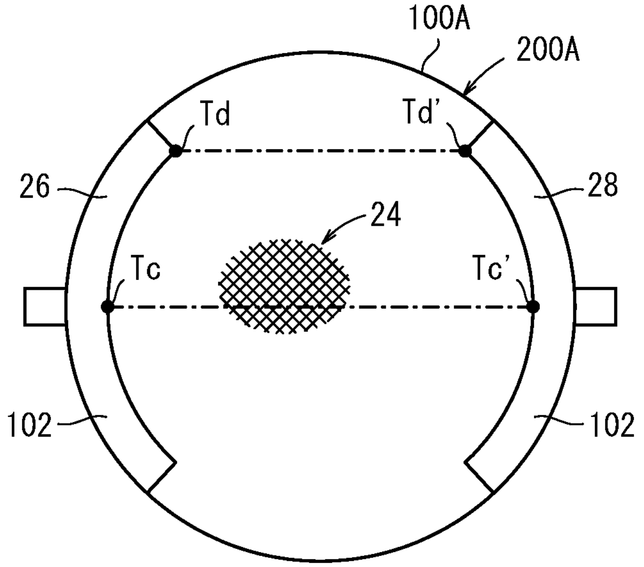
FIG. 28 is a plan view showing a front cover according to Reference Example 1.

A transparent film 40 having a curved surface shape was prepared in the same manner as Example 1. Then, instead of the conductive copper tapes (the first copper tapes 48*a*) having a width of 12.5 mm and a length of 70 mm, conductive copper tapes 102 were attached to the opposite circumference portions to form a first electrode 26 and a second electrode 28 having an arc shape with a length of approximately 80 mm. A heat generator 200A having a circular projected shape was produced without cutting the end curved portions 41 of the transparent film 40, and was insert-formed. Thus, as shown in FIG. 28, a front cover 100A according to Reference Example 1 was produced.

(Evaluation)

In each front cover, the minimum value Lmin and the maximum value Lmax of the distance between the first electrode 26 and the second electrode 28 (the electrode distance) were measured, and the parameter Pm was obtained using the following expression:

$$Pm=(\text{Lmax}-\text{Lmin})/((\text{Lmax}+\text{Lmin})/2).$$

In Example 1, as shown in FIG. 27, the maximum value Lmax of the distance between the electrodes was the length of an arc between points Ta and Ta' (shown by a dashed-dotted line, protruded frontward in the drawing, throughout Examples), and the minimum value Lmin of the electrode distance was the length of an arc between points Tb and Tb'. The front cover 10A of Example 1 had a maximum value Lmax of 70 mm and a minimum value Lmin of 66 mm, and thus had a parameter Pm of 0.059 obtained using the above expression.

On the other hand, in Reference Example 1, as shown in FIG. 28, the maximum value Lmax of the distance between the electrodes was the length of an arc between points Tc and Tc', and the minimum value Lmin of the electrode distance was the length of an arc between points Td and Td'. The front cover 100A of Reference Example 1 had a maximum value Lmax of 105 mm and a minimum value Lmin of 50 mm, and thus had a parameter Pm of 0.710 obtained using the above expression.

Figure 29:
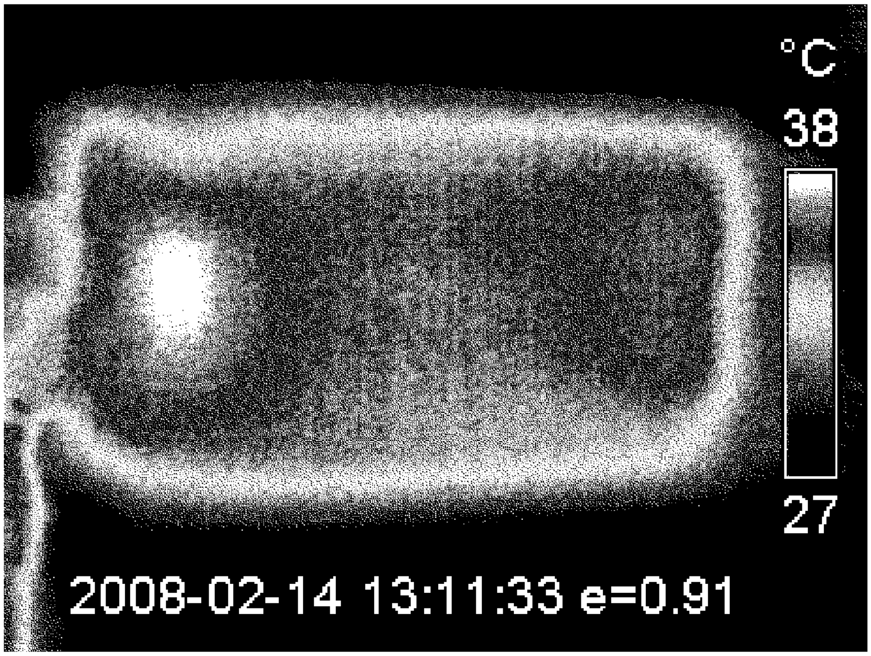
FIG. 29 is a chart showing a temperature distribution of a heat generator according to Example 1.
Figure 30:
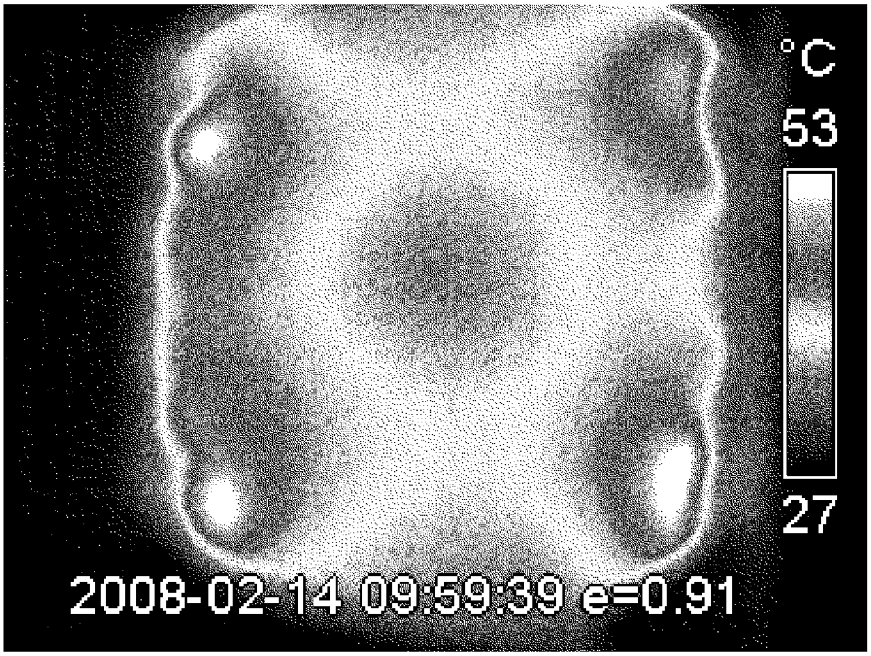
FIG. 30 is a chart showing a temperature distribution of a heat generator according to Reference Example 1.

In each of the front cover 10A of Example 1 and the front cover 100A of Reference Example 1, a direct voltage was applied between the first electrode 26 and the second electrode 28. After the voltage was applied for 10 minutes, the cover surface temperatures were measured by an infrared thermometer to confirm the temperature distribution. The measurement was carried out at the room temperature of 20° C. The results of the temperature distribution measurement are shown in FIGS. 29 and 30, and the measured temperatures (the minimum and maximum temperatures) and the temperature rises (the minimum, maximum, and average rises) are shown in Table 3. The temperature distribution of Example 1 is shown in FIG. 29, and that of Reference Example 1 is shown in FIG. 30.

TABLE 3

| | Measured temperature (° C.) | | | Temperature rise (° C.) | | | Electrode distance (mm) | | |
|---|---|---|---|---|---|---|---|---|---|
| | Minimum | Maximum | Difference | Minimum | Maximum | Average | Lmax | Lmin | Pm |
| Example 1 | 33 | 38 | 5 | 13 | 18 | 15.5 | 70 | 66 | 0.059 |
| Reference Example 1 | 33 | 53 | 20 | 13 | 33 | 23.0 | 105 | 50 | 0.710 |

The front cover 10A of Example 1 exhibited a difference of approximately 5° C. between the minimum and maximum temperatures, a minimum temperature rise of 13° C., a maximum temperature rise of 18° C., and an average temperature rise of 15.5° C. In Example 1, the energy could be reduced by 2.5° C. as compared with an example requiring a temperature rise of 18° C. on average, thereby being advantageous in energy saving. In addition, as shown in FIG. 29, the heat generation was uniformly caused in the entire heat generator.

In contrast with Example 1, the front cover 100A of Reference Example 1 exhibited a larger difference of 20° C. between the minimum and maximum temperatures, a larger average temperature rise of 23.0° C., a minimum temperature rise of 13° C., a maximum temperature rise of 33° C., and a larger variation. In addition, as shown in the temperature distribution of FIG. 30, the heat generation was caused only in the vicinity of the ends of the first and second electrodes and was hardly caused in the center.

As is clear from the above results, the heat generator of Example 1 satisfying the inequality of Pm≤0.375 exhibited uniform heat generation on the entire surface, unlike the heat generator of Reference Example 1 not satisfying the inequality.

Second Example

Front covers containing a heat generator according to Examples 2 to 5 and a front cover according to Reference Example 2 were produced, and the distances between the electrodes and the differences between the minimum and maximum temperatures were measured to confirm the effects of the embodiment.

Figure 31:
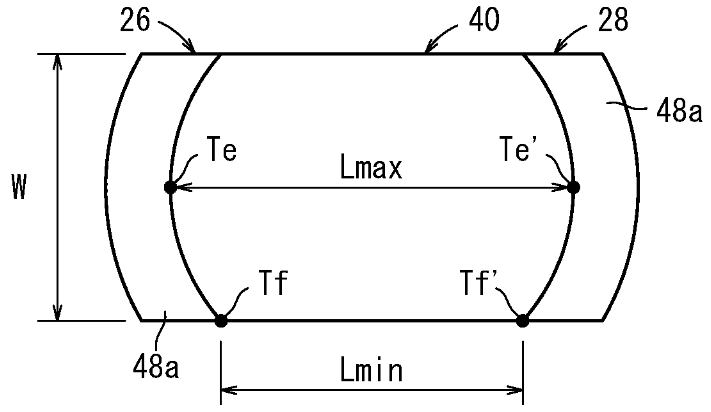
FIG. 31 is a plan view showing first and second electrodes formed on a transparent film having a curved surface shape in production of front covers according to Examples 2 to 5 and Reference Example 2.

In each of the front covers of Examples 2 to 5 and Reference Example 2, the difference between the minimum and maximum temperatures was measured. In Examples 2 to 5 and Reference Example 2, a transparent film 40 having a mesh pattern 24 was formed under vacuum using a forming mold 42 (see FIGS. 6A and 6B) in the same manner as Example 1. The forming mold 42 had a shape provided by cutting off a part of a sphere having a radius of 100 mm, and had a diameter of 173 mm. As shown in FIG. 10, the periphery of the transparent film 40 having the curved surface shape was cut along a cutting line L1 corresponding to the formed shape to obtain a circular projected shape, and curved portions 41 at the ends were cut off along cutting lines L2 and L3. Thus, as shown in FIG. 31, transparent films 40 according to Examples 2 to 5 and Reference Example 2 were prepared. The width W was 60 mm in Example 2, 80 mm in Example 3, 90 mm in Example 4, 110 mm in Example 5, and 130 mm in Reference Example 2.

Then, as shown in FIG. 31, conductive copper tapes having a width of 15 mm (first copper tapes 48*a*) were attached to the opposite circumference portions of the transparent film 40 to form a first electrode 26 and a second electrode 28. Thus obtained heat generator was subjected to an injection forming in the same manner as Example 1, whereby heater-integrated-type front covers according to Examples 2 to 5 and Reference Example 2 were produced, respectively.

(Evaluation)

Also in each of the front covers, the minimum value Lmin and the maximum value Lmax of the distance between the first electrode 26 and the second electrode 28 (the electrode distance) were measured, and the parameter Pm was obtained using the following expression:

$$Pm=(Lmax-Lmin)/((Lmax+Lmin)/2).$$

As shown in FIG. 31, in Examples 2 to 5 and Reference Example 2, the maximum value Lmax of the electrode distance was the length of an arc between points Te and Te' (protruded frontward in the drawing, throughout Examples), and the minimum value Lmin of the electrode distance was the length of an arc between points Tf and Tf'. The maximum value Lmin, the minimum value Lmin, and the parameter Pm in each of Examples 2 to 5 and Reference Example 2 are shown in the right of Table 4.

In each of the front covers of Examples 2 to 5 and Reference Example 2, a direct voltage was applied between the first electrode 26 and the second electrode 28. After the voltage was applied for 10 minutes, the cover surface temperatures were measured by an infrared thermometer to confirm the temperature distribution. The measurement was carried out at the room temperature of 20° C. The measured temperatures (the minimum temperature, the maximum temperature, and the difference thereof) are shown in the left of Table 4.

TABLE 4

| | Measured temperature (° C.) | | | Electrode distance (mm) | | |
|---|---|---|---|---|---|---|
| | Minimum | Maximum | Difference | Lmax | Lmin | Pm |
| Example 2 | 34 | 39 | 5 | 209 | 194 | 0.074 |
| Example 3 | 32 | 38 | 6 | 209 | 182 | 0.139 |
| Example 4 | 31 | 39 | 8 | 209 | 174 | 0.182 |
| Example 5 | 26 | 38 | 12 | 209 | 155 | 0.298 |
| Reference Example 2 | 24 | 40 | 16 | 209 | 130 | 0.471 |

Each front cover of Examples 2 to 4 exhibited a difference of approximately 5° C. to 8° C., and the front cover of Example 5 exhibited a difference of approximately 12° C., between the minimum and maximum temperatures. Thus, the front covers of Examples 2 to 5 exhibited uniform heat generation on the entire surfaces, thereby being advantageous in energy saving. In contrast, the front cover of Reference Example 2 exhibited a difference of 16° C., and the heat generation was not uniformly caused on the entire heat generator.

As is clear from the above results, the heat generators of Examples 2 to 5 satisfying the inequality of Pm≤0.375 exhibited uniform heat generation on the entire surfaces, unlike the heat generator of Reference Example 2 not satisfying the inequality.

Third Example

The present invention will be described more specifically below with reference to Third Example. In Third Example, Comparative Examples 11 and 12 and Examples 11 to 13 were evaluated with respect to influence of stretching on resistance values, conductivity, and wire breaking.

In Comparative Examples 11 and 12 and Examples 11 to 13, the vacuum forming, the formation of the first electrode 26 and the second electrode 28, and the cutting treatment were carried out in the same manner as Example 1. Therefore, the formation of conductive layers 21 will be mainly described below. In Third Example, the injection forming was not carried out, and each transparent film 40 was evaluated after the cutting treatment.

Comparative Example 11

An ITO (indium tin oxide) film was formed by sputtering on a main surface of the transparent film 40. Thus, a transparent film 40 having a mesh pattern of the ITO film was obtained.

Comparative Example 12

A surface of a 0.15-mm-thick stainless steel plate was cleaned, and a commercially-available negative photoresist KOR (trade name, available from Tokyo Ohka Kogyo Co., Ltd.) was applied thereto and dried. The photoresist was contact-exposed in a predetermined mesh pattern, and then developed and dried to prepare an electrodeposition substrate.

The electrodeposition substrate was introduced to a copper plating bath, whereby copper was electrodeposited on portions not coated with the resist in the electrodeposition substrate. The electrodeposition substrate was used as a negative electrode, and a copper plate was used as a positive electrode.

A light hardening adhesive was uniformly applied into a thickness of approximately 1 μm to a surface of a 5-mm-thick transparent acrylic substrate in view of transferring the above electrodeposited copper to the transparent substrate. The light hardening adhesive was mainly composed of an acrylate monomer and a photopolymerization initiator. In this example, 2-ethylhexyl acrylate, 1.4-butanediol acrylate, etc. was used as the acrylate monomer, and benzoyl peroxide was used as the photopolymerization initiator.

The copper-electrodeposited substrate and the light hardening adhesive-coated acrylic substrate were uniformly bonded under a pressure, and the acrylic substrate was irradiated with an ultraviolet ray. The electrodeposited copper was bonded to the acrylic substrate with an excellent adhesion, while the insulating resist was bonded thereto with a poor adhesion. Therefore, when the stainless steel electrodeposition substrate was slowly peeled off, all the electrodeposited copper was transferred to the transparent substrate. Thus, a transparent film 40 having a mesh pattern of the electrodeposited copper was obtained.

Example 11

Example 11 is equal to Example 1, and therefore the explanation of Example 11 is herein omitted.

Example 12

A 10-μm-thick copper foil was used as a conductive layer 21. The copper foil and a 100-μm-thick polyethylene terephthalate (PET) film A4300 (trade name, available from Toyobo Co., Ltd.) were laminated using a polyurethane adhesive, and the laminate was aged at 56° C. for 4 days. The adhesive contained a base TAKELAC A-310 and a hardener A-10 (trade names, both available from Takeda Pharmaceutical Co. Ltd.), and the dry thickness of the applied adhesive was 7 μm.

A mesh pattern was formed by a photolithography process using a production line, in which a continuous strip could be masked and etched. First, a casein resist was applied to the entire surface of the copper foil by a pouring method. Then, the casein resist was contact-exposed using a pattern plate for forming the same mesh pattern 24 as Example 1. The resist was water-developed, hardened, and baked at 100° C.

The copper foil was etched by spraying an etchant of a ferric chloride solution at 30° C. and 42° Baume to form openings. The laminate was water-washed, the resist was peeled off, and the resultant was washed and dried at 100° C. Thus, a transparent film 40 having a mesh pattern 24 of the copper foil was obtained.

Example 13

A PET film having a thickness of 100 μm was subjected to a corona discharge treatment. The following easy adhesion layer-1 (a) and easy adhesion layer-2 (b) were formed in this order on the PET film, and the resultant was dried at 180° C. for 4 minutes. The following carbon nanotube layer (c) was further formed thereon, and the resultant was water-washed to remove the disperser of sodium dodecylbenzenesulfonate. The following overcoating layer (d) was further formed thereon, and the resultant was dried at 180° C. for 40 minutes. Thus, a transparent film 40 having a conductive layer of the carbon nanotube layer was obtained. The conductive layer had a surface resistance of 320 ohm/sq.

(a) Easy Adhesion Layer-1

| | |
|---|---|
| Polymer latex (styrene/butadiene/hydroxyethyl methacrylate/divinylbenzene = 67/30/2.5/0.5 (% by weight), Tg = 20° C.) | 160 mg/$m^2$ |
| 2,4-Dichloro-6-hydroxy-s-triazine | 4 mg/$m^2$ |
| Matting agent (polystyrene, average particle diameter 2.4 μm) | 3 mg/$m^2$ |

(b) Easy Adhesion Layer-2

| | |
|---|---|
| Alkali-treated gelatin ($Ca^{++}$ content 30 ppm, jelly strength 230 g) | 50 mg/$m^2$ |
| Following compound | 10 mg/$m^2$ |

Compound-1

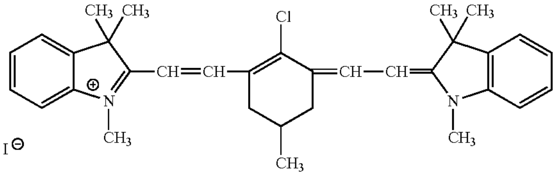 [SMILES: [I-] ; CC1CC(=CC=C2N(C)c3ccccc3C2(C)C)C(Cl)=C(C=CC2=[N+](C)c3ccccc3C2(C)C)C1]

(c) Carbon Nanotube Layer

| | |
|---|---|
| Carbon nanotube (SWNT available from Carbon Nanotechnologies Inc.) | 12 mg/$m^2$ |
| Sodium dodecylbenzenesulfonate | 48 mg/$m^2$ |
| (d) Overcoating layer | |
| JURYMER ET-410 (available from Nihon Junyaku Co., Ltd., Tg = 52° C.) | 38 mg/$m^2$ |
| Matting agent (polymethyl methacrylate, average particle diameter 5 μm) | 7 mg/$m^2$ |
| DENACOL EX-614B (available from Nagase Chemicals Ltd.) | 13 mg/$m^2$ |

(Evaluation)

The stretch ratio, the conductivity after shape forming, and the wire breaking after shape forming in each example were evaluated.

The stretch ratio was evaluated as follows. Each transparent film 40 was cut into a width of 10 mm and a length of 200 mm, and 5-mm copper foils were attached to positions at 20 mm from the ends of the transparent film 40. The copper foils extended over the width of the transparent film 40, and were used as a pair of electrodes. The electrode distance was 150 mm. The ends of the transparent film 40 were fixed by chucks respectively using a tensile tester STROGRAPH VE5D manufactured by Toyo Seiki Seisaku-sho, Ltd. The distance between the chucks was 170 mm. The transparent film 40 was pulled at a rate of 2 mm/minute while continuously measuring the electrical resistance between the electrodes, whereby the stretch ratio and the electrical resistance change were measured.

The conductivity after shape forming was evaluated as "Good" when the surface resistance of the conductive layer 21 was within the range of 10 to 500 ohm/sq or as "Poor" when the surface resistance was not within the range.

The wire breaking after shape forming was confirmed by visual observation. The wire breaking was evaluated as "Poor" when the wire was broken in most regions of the conductive layer 21, as "Fair" when the wire was broken only in part, or as "Good" when the wire was not broken.

The evaluation results are shown in Table 5.

TABLE 5

| | Stretch ratio at which resistance value becomes twice the initial value | Conductivity after shape forming | Wire breaking after shape forming |
|---|---|---|---|
| Comparative Example 11 | 1.8% | Poor | Poor |
| Comparative Example 12 | 2.6% | Poor | Poor |
| Example 11 | 29% | Good | Good |
| Example 12 | 11% | Good | Fair |
| Example 13 | 28% | Good | Good |

As shown in Table 5, both of the samples of Comparative Examples 11 and 12 exhibited a stretch ratio of less than 5%, and could not be formed into a curved surface shape. In addition, the samples were poor in the conductivity after shape forming, and the wires were broken in the most regions.

In contrast, both of the sample using the silver salt emulsion layer of Example 11 and the sample using the carbon nanotube layer of Example 13 exhibited a stretch ratio of 25% or more. In addition, the samples had good conductivities and no wire breaking after the shape forming. Therefore, even when the heat generator 20 had a curved surface shape with a large curvature (e.g. a minimum curvature radius of 300 mm or less), the wire breaking could be prevented, the local increase or decrease of the resistance value could be prevented, and an approximately expected resistance value distribution could be obtained. Incidentally, though the sample using the copper foil of Example 12 exhibited a stretch ratio of 11% and a good conductivity after the shape forming, the wire breaking was observed in part.

Fourth Example

The present invention will be described more specifically below with reference to Fourth Example. In Fourth Example, EL devices of Examples 21 to 28 and Comparative Examples 21 to 25 were evaluated with respect to the influence of the silver/binder volume ratio in a silver salt emulsion layer on the display quality. The conditions and evaluation results of Examples 21 to 28 and Comparative Examples 21 to 25 are shown in Table 6.

Example 21

Preparation of Conductive Film

A mesh pattern was formed on a transparent film in the same manner as Example 1 except that the silver salt emulsion layer had an applied silver amount of 10 g/m$^2$ and a silver/binder volume ratio of 2/1, a phthalated gelatin was used as the binder, and the thin metal wires formed by exposing and developing the silver salt emulsion layer was subjected to a calender treatment and a vapor contact treatment. A conductive polymer Baytron PEDOT (a polyethylene dioxythiophene, available from TA Chemical Co.) was applied to the surface having the mesh pattern at a rate of 0.5 ml/m$^2$, and the applied polymer was dried to prepare a conductive film.

Preparation of Fluorescent Particle A

A dry powder containing 25 g of a zinc sulfide (ZnS) particle powder having an average particle diameter of 20 nm doped with 0.07 mol % (based on the ZnS) of copper sulfate, a flux containing moderate amounts of NaCl, MgCl, and an ammonium chloride ($NH_3Cl$) powder, and 20% by mass (based on the fluorescent powder) of a magnesium oxide powder were burned in an alumina crucible at 1200° C. for 3.5 hours and then cooled. The resultant powder was crushed and dispersed by a ball mill, and 5 g of $ZnCl_2$ and 0.10 mol % (based on the ZnS) of copper sulfate were added thereto. 1 g of $MgCl_2$ was further added thereto, and the obtained dry powder was burned again in the alumina crucible at 700° C. for 6 hours. The burning was carried out in a flow of a 10% hydrogen sulfide gas.

The burned powder was crushed again. The resultant particles were dispersed and deposited in $H_2O$ at 40° C., and the supernatant was removed, so that the particles were washed. A 10% hydrochloric acid solution was added thereto, the particles were dispersed and deposited therein, and the supernatant was removed, so that the unnecessary salts were removed. The particles were dried, and Cu ions and the like on the surface were removed by a 10% KCN solution heated at 70° C. Then, surface layers of the particles (10% by mass of the particles) were etched and removed by a 6 mol/L hydrochloric acid. The resultant particles were sieved to obtain small particles.

The obtained fluorescent particles had an average particle diameter of 10.3 μm and a variation coefficient of 20%. The particles were crushed in a mortar, and the pieces having a thickness of 0.2 μm or less were taken out and subjected to an electron microscope observation under an accelerating voltage of 200 kV. As a result, at least 80% of the pieces had a portion with 10 or more stacking faults at a distance of 5 nm or less, and had a blue-green color with an emission peak at 500 nm.

Preparation of Fluorescent Particle B

The burning was carried out at 1200° C. for 3.5 hours in the same manner as the preparation of the fluorescent particles A except that the dry powder contained 25 g of a zinc sulfide (ZnS) particle powder having an average particle diameter of 20 nm doped with 0.08 mol % (based on the ZnS) of copper sulfate and 0.2 mol % (based on the ZnS) of manganese carbonate. The subsequent processes were carried out in the same manner as the preparation of the fluorescent particles A, for preparing fluorescent particles B.

The obtained fluorescent particles B had an average particle diameter of 9.3 μm, and at least 85% of the crushed pieces had 10 or more stacking faults at a distance of 5 nm or less and exhibited an orange emission.

[Production of EL Device]

Fine $BaTiO_3$ particles having an average size of 0.02 μm were dispersed in a 30-wt % cyanoresin liquid. The dispersion was applied to an aluminum sheet having a thickness of 75 μm (a back electrode) and dried at 120° C. for 1 hour by a hot-air dryer to form a dielectric layer having a thickness of 25 μm.

The above fluorescent particles A and B were mixed such that the emission color had x of 3.3±0.2 and y of 3.4±0.2 in the CIE chromaticity coordinates, and the mixture was dispersed in a 30-wt % cyanoresin liquid. The dispersion was applied to the dielectric layer on the substrate of the above prepared conductive film (10 cm×10 cm), and dried at 120° C. for 1 hour by a hot-air dryer to form a fluorescent layer having a thickness of 20 μm. Thus, a plate-shaped EL device was produced.

A terminal for external connection was formed using a 80-μm-thick copper-aluminum sheet on each of the conductive film and the back electrode. The EL device was sandwiched between two absorbent nylon 6 sheets and two damp-proof $SiO_2$ films, and then was thermally compression-bonded.

[Vacuum Forming]

The above plate-shaped EL device 160 was formed under vacuum using a forming mold 172 (see FIGS. 24A and 24B). In the vacuum forming, the EL device 160 was preheated for 5 seconds by a hot plate at 195° C. and then immediately pressed onto the forming mold 172, and an air pressure of 0.7 MPa was applied to the EL device 160 while vacuuming from the forming mold 172. Thus, an EL device having an entirely curved surface shape of Example 21 was produced.

Example 22

An EL device of Example 22 was produced in the same manner as Example 21 except that the silver salt emulsion layer had a silver/binder volume ratio of 3/1.

Example 23

An EL device of Example 23 was produced in the same manner as Example 21 except that the silver salt emulsion layer had a silver/binder volume ratio of 4/1.

Example 24

An EL device of Example 24 was produced in the same manner as Example 21 except that the silver salt emulsion layer had a silver/binder volume ratio of 6/1.

Example 25

An EL device of Example 25 was produced in the same manner as Example 21 except that the silver salt emulsion layer had a silver/binder volume ratio of 1/2, and the calender treatment and the vapor contact treatment were not performed.

Example 26

An EL device of Example 26 was produced in the same manner as Example 21 except that the silver salt emulsion layer had a silver/binder volume ratio of 1/1.5, and the calender treatment and the vapor contact treatment were not performed.

Example 27

An EL device of Example 27 was produced in the same manner as Example 21 except that the silver salt emulsion layer had a silver/binder volume ratio of 1/1, and the calender treatment and the vapor contact treatment were not performed.

Example 28

An EL device of Example 28 was produced in the same manner as Example 21 except that the silver salt emulsion layer had a silver/binder volume ratio of 1.5/1, and the calender treatment and the vapor contact treatment were not performed.

Comparative Example 21

An EL device of Comparative Example 21 was produced in the same manner as Example 21 except that the silver salt emulsion layer had a silver/binder volume ratio of 1/1.

Comparative Example 22

An EL device of Comparative Example 22 was produced in the same manner as Example 21 except that the silver salt emulsion layer had a silver/binder volume ratio of 7/1.

Comparative Example 23

An EL device of Comparative Example 23 was produced in the same manner as Example 21 except that the silver salt emulsion layer had a silver/binder volume ratio of 1/3, and the calender treatment and the vapor contact treatment were not performed.

Comparative Example 24

An EL device of Comparative Example 24 was produced in the same manner as Example 21 except that the silver salt emulsion layer had a silver/binder volume ratio of 2/1, and the calender treatment and the vapor contact treatment were not performed.

Comparative Example 25

A silver salt emulsion liquid was prepared in the same manner as Example 21 except that the silver salt emulsion layer had a silver/binder volume ratio of 3/1, and the calender treatment and the vapor contact treatment were not performed. However, the liquid could not be filtered due to a large amount of aggregations. Thus, the conductive film could not be prepared.

[Evaluation]

A driving voltage was applied between the conductive film 162 and the back electrode 166 of each plate-shaped EL device 160 before the vacuum forming, whereby a white color was displayed on the entire surface at a predetermined maximum luminance, and the variation of the average illuminance was measured by an illuminometer. Specifically, thirty measurement points were selected in the entire display surface such that the measurement points were evenly distributed on the surface. The illuminances of the thirty measurement points were measured by the illuminometer, and the average illuminance was calculated from the measured thirty illuminances. The display quality was evaluated as "Excellent" when the difference between the calculated average illuminance and the predetermined maximum average illuminance was 5% or less, as "Good" when the difference was more than 5% and at most 10%, as "Fair" when the difference was more than 10% and at most 20%, or as "Poor" when the difference was more than 20%. The display quality was deteriorated when the conductive film 162 had a high surface resistance or the mesh pattern 24 had a broken wire.

Then, a driving voltage was applied between the conductive film 162 and the back electrode 166 of each vacuum-formed EL device 160 having the curved surface shape, whereby a white color was displayed on the entire surface at a predetermined maximum luminance, and the variation of the average illuminance was measured by an illuminometer to evaluate the display quality in the same manner as above.

The evaluation results are shown in Table 6.

TABLE 6

| | Calender treatment and vapor contact treatment | Applied silver amount ($g/m^2$) | Silver/binder volume ratio | Display quality: Before vacuum shape forming | Display quality: After vacuum shape forming |
|---|---|---|---|---|---|
| Comparative Example 21 | Performed | 10 | 1/1 | Excellent | Poor |
| Example 21 | Performed | 10 | 2/1 | Excellent | Excellent |
| Example 22 | Performed | 10 | 3/1 | Excellent | Excellent |
| Example 23 | Performed | 10 | 4/1 | Excellent | Excellent |
| Example 24 | Performed | 10 | 6/1 | Good | Good |
| Comparative Example 22 | Performed | 10 | 7/1 | Fair | Poor |
| Comparative Example 23 | Not performed | 10 | 1/3 | Fair | Fair |
| Example 25 | Not performed | 10 | 1/2 | Good | Good |
| Example 26 | Not performed | 10 | 1/1.5 | Excellent | Excellent |
| Example 27 | Not performed | 10 | 1/1 | Excellent | Excellent |
| Example 28 | Not performed | 10 | 1.5/1 | Excellent | Excellent |
| Comparative Example 24 | Not performed | 10 | 2/1 | Fair | Poor |
| Comparative Example 25 | Not performed | 10 | 3/1 | Conductive film could not be prepared | |

As is clear from the evaluation results, the EL device of Comparative Example 21 exhibited an excellent display quality before the vacuum forming (in the plate shape), but exhibited a deteriorated display quality after the vacuum forming (in the curved surface shape). This was presumed because the binder was eluted by the vapor contact, the silver salt emulsion layer became brittle, and the silver wire was broken in the formation of the curved surface. The EL device of Comparative Example 22 exhibited a slightly deteriorated display quality before the vacuum forming (in the plate shape), and exhibited a deteriorated display quality after the vacuum forming (in the curved surface shape). This was presumed because the dispersion of the silver salt emulsion layer was deteriorated at an excessively high silver/binder volume ratio, and the flexibility of the layer was reduced due to the dispersion deterioration.

Meanwhile, in the evaluation results of the examples not containing the calender treatment and the vapor contact treatment, the EL device of Comparative Example 23 having a low silver/binder volume ratio exhibited a slightly deteriorated display quality before the vacuum forming due to the low conductivity of the film, and exhibited the same display quality even after the vacuum forming. When the silver/binder volume ratio was increased, an aggregation was increased in the silver salt emulsion. Thus, the EL device of Comparative Example 24 exhibited a slightly deteriorated display quality before the vacuum forming, and exhibited a deteriorated display quality after the vacuum forming due to the silver wire breaking.

Therefore, when the thin metal wires formed by exposing and developing the silver salt emulsion are subjected to the calender treatment or the vapor contact treatment, the silver/binder volume ratio is preferably 2/1 or more, more preferably 2/1 to 6/1, further preferably 2/1 to 4/1. On the other hand, when the thin metal wires formed by exposing and developing the silver salt emulsion are not subjected to the calender treatment or the vapor contact treatment, the silver/binder volume ratio is preferably less than 2/1, more preferably 1/2 to 1.5/1, further preferably 1/1.5 to 1.5/1.

Fifth Example

The present invention will be described more specifically below with reference to Fifth Example. In Fifth Example, EL devices of Examples 31 to 38 and Comparative Examples 31 to 35 were evaluated with respect to the influence of the applied silver amount in a silver salt emulsion layer on the display quality. The conditions and evaluation results of Examples 31 to 38 and Comparative Examples 31 to 35 are shown in Table 7.

Example 31

An EL device of Example 31 was produced in the same manner as Example 21 except that the silver salt emulsion layer had an applied silver amount of 5 $g/m^2$ and an antimony-doped tin oxide (SN100P available from Ishihara Sangyo Kaisha, Ltd.) was applied at 0.42 $g/m^2$ instead of Baytron PEDOT.

Example 32

An EL device of Example 32 was produced in the same manner as Example 31 except that the silver salt emulsion layer had an applied silver amount of 7.5 $g/m^2$.

Example 33

An EL device of Example 33 was produced in the same manner as Example 31 except that the silver salt emulsion layer had an applied silver amount of 15 $g/m^2$.

Example 34

An EL device of Example 34 was produced in the same manner as Example 31 except that the silver salt emulsion layer had an applied silver amount of 20 $g/m^2$.

Example 35

An EL device of Example 35 was produced in the same manner as Example 31 except that the silver salt emulsion layer had an applied silver amount of 6 $g/m^2$ and a silver/binder volume ratio of 1/1, and the calender treatment and the vapor contact treatment were not performed.

Example 36

An EL device of Example 36 was produced in the same manner as Example 31 except that the silver salt emulsion layer had an applied silver amount of 7.5 $g/m^2$ and a silver/binder volume ratio of 1/1, and the calender treatment and the vapor contact treatment were not performed.

Example 37

An EL device of Example 37 was produced in the same manner as Example 31 except that the silver salt emulsion layer had an applied silver amount of 10 $g/m^2$ and a silver/binder volume ratio of 1/1, and the calender treatment and the vapor contact treatment were not performed.

Example 38

An EL device of Example 38 was produced in the same manner as Example 31 except that the silver salt emulsion layer had an applied silver amount of 15 $g/m^2$ and a silver/binder volume ratio of 1/1, and the calender treatment and the vapor contact treatment were not performed.

Comparative Example 31

An EL device of Comparative Example 31 was produced in the same manner as Example 31 except that the silver salt emulsion layer had an applied silver amount of 3 $g/m^2$.

Comparative Example 32

An EL device of Comparative Example 32 was produced in the same manner as Example 31 except that the silver salt emulsion layer had an applied silver amount of 4 $g/m^2$.

Comparative Example 33

An EL device of Comparative Example 33 was produced in the same manner as Example 31 except that the silver salt emulsion layer had an applied silver amount of 25 $g/m^2$.

Comparative Example 34

An EL device of Comparative Example 34 was produced in the same manner as Example 31 except that the silver salt emulsion layer had an applied silver amount of 4 $g/m^2$ and a silver/binder volume ratio of 1/1, and the calender treatment and the vapor contact treatment were not performed.

Comparative Example 35

An EL device of Comparative Example 35 was produced in the same manner as Example 31 except that the silver salt emulsion layer had an applied silver amount of 5 $g/m^2$ and a silver/binder volume ratio of 1/1, and the calender treatment and the vapor contact treatment were not performed.

[Evaluation]

In the same manner as Fourth Example (Example 21 etc.), a driving voltage was applied between the conductive film 162 and the back electrode 166 of each plate-shaped EL device 160 before the vacuum forming, whereby a white color was displayed on the entire surface at a predetermined maximum luminance, and the variation of the average illuminance was measured by an illuminometer. Then, a driving voltage was applied between the conductive film 162 and the back electrode 166 of each vacuum-formed EL device 160 having the curved surface shape, whereby a white color was displayed on the entire surface at a predetermined maximum luminance, and the variation of the average illuminance was measured by an illuminometer to evaluate the display quality in the same manner as above.

The evaluation results are shown in Table 7.

TABLE 7

| | Calender treatment and vapor contact treatment | Applied silver amount ($g/m^2$) | Silver/binder volume ratio | Display quality: Before vacuum shape forming | Display quality: After vacuum shape forming |
|---|---|---|---|---|---|
| Comparative Example 31 | Performed | 3 | 2/1 | Poor | Poor |
| Comparative Example 32 | Performed | 4 | 2/1 | Fair | Fair |
| Example 31 | Performed | 5 | 2/1 | Good | Good |
| Example 32 | Performed | 7.5 | 2/1 | Excellent | Excellent |

TABLE 7-continued

| | Calender treatment and vapor contact treatment | Applied silver amount ($g/m^2$) | Silver/binder volume ratio | Display quality: Before vacuum shape forming | Display quality: After vacuum shape forming |
|---|---|---|---|---|---|
| Example 33 | Performed | 15 | 2/1 | Excellent | Excellent |
| Example 34 | Performed | 20 | 2/1 | Excellent | Good |
| Comparative Example 33 | Performed | 25 | 2/1 | Excellent | Poor |
| Comparative Example 34 | Not performed | 4 | 1/1 | Poor | Poor |
| Comparative Example 35 | Not performed | 5 | 1/1 | Fair | Fair |
| Example 35 | Not performed | 6 | 1/1 | Good | Good |
| Example 36 | Not performed | 7.5 | 1/1 | Excellent | Excellent |
| Example 37 | Not performed | 10 | 1/1 | Excellent | Excellent |
| Example 38 | Not performed | 15 | 1/1 | Excellent | Excellent |

As is clear from the evaluation results, the EL devices of Comparative Examples 31, 32, and 34 having small applied silver amounts of 4 $g/m^2$ or less each exhibited a deteriorated or slightly deteriorated display quality even before the vacuum forming due to the insufficient conductivity. The EL device of Comparative Example 33 having an increased applied silver amount of 25 $g/m^2$ exhibited an excellent display quality before the vacuum forming, but exhibited a deteriorated display quality after the vacuum forming. This was presumed because the silver wire had an excessively large thickness and a deteriorated flexibility and thereby was broken in the vacuum forming.

Therefore, the applied silver amount of the silver salt emulsion layer is preferably 5 $g/m^2$ or more, more preferably 7.5 to 20 $g/m^2$. Obviously, since the silver is expensive, it is preferable to use the silver at the smallest amount for achieving the effects.

In addition, the EL devices of Fourth and Fifth Examples were confirmed to satisfy the requirement of claim 1 in the same manner as the heat generators of First to Third Examples.

It is to be understood that the curved-surface body, the curved-surface body production method, the car light front cover, and the car light front cover production method of the present invention are not limited to the above embodiments, and various changes and modifications may be made therein without departing from the scope of the invention.

The invention claimed is:

1. A curved-surface body comprising:

a transparent substrate having a three-dimensional curved surface, a transparent conductor, and opposing first and second electrodes formed at opposite ends of the transparent conductor, the transparent conductor having a surface resistance of 10 to 500 Ω/sq and an electrical resistance of 12 to 120 Ω, wherein when the transparent conductor has a first electrical resistance value R0 before being stretched and a second electrical resistance value Ra after being stretched by 5%, the transparent conductor maintains a relationship:

$$Ra \leq (2 \times R0),$$

the transparent conductor has a curved surface that has a curvature radius of 300 mm or less, and when a first set of opposite points in the first electrode and the second electrode has a minimum distance value Lmin, wherein each point of the first set of opposite points are located along the boundaries where the first and second electrodes touch the transparent conductor, respectively, and a second set of opposite points in the first electrode and the second electrode has a maximum distance value Lmax, wherein each point of the first set of opposite points are located along the boundaries where the first and second electrodes touch the transparent conductor, respectively, the first electrode and the second electrode satisfy the relationship:

(Lmax−Lmin)/((Lmax+Lmin)/2)<0.375.

2. The curved-surface body according to claim 1, wherein when the transparent conductor has a third electrical resistance value Rb after being stretched by 15%, the transparent conductor satisfies a relationship:

$$Rb \leq (2 \times R0).$$

3. The curved-surface body according to claim 1, wherein the transparent conductor includes randomly-dispersed metal nanomaterials each having a diameter of 2 μm or less, which are crossed and connected to each other.

4. The curved-surface body according to claim 1, wherein the transparent conductor includes randomly-dispersed carbon nanotubes, which are crossed and connected to each other.

5. The curved-surface body according to claim 1, wherein the transparent conductor includes a number of connected metal wires formed by exposing and developing a silver salt emulsion layer containing a silver halide, the metal wires have a width of 1 to 40 μm, and the metal wires are arranged at a distance of 0.1 to 50 mm.

6. The curved-surface body according to claim 5, wherein the silver salt emulsion layer has an amount of silver salt of 1 to 20 $g/m^2$.

7. The curved-surface body according to claim 5, wherein the silver salt emulsion layer has a silver salt/binder volume ratio of 2/1 or more.

8. The curved-surface body according to claim 5, wherein the silver salt emulsion layer has a silver salt/binder volume ratio of less than 2/1.

9. The curved-surface body according to claim 1, wherein the transparent conductor includes a plurality of metal wires each having a width of 1 to 40 microns and each extending in a horizontal or vertical direction relative to the curved surface of the transparent conductor, and a distance between the metal wires extending in the horizontal direction is two or more times as large as a distance between the metal wires extending in the vertical direction.

10. The curved-surface body according to claim 1, wherein the transparent conductor includes a plurality of metal wires each having a width of 1 to 40 microns and each extending only in a vertical direction relative to the curved surface of the transparent conductor.

* * * * *